(12) United States Patent
Zhang et al.

(10) Patent No.: US 12,587,937 B2
(45) Date of Patent: Mar. 24, 2026

(54) CONDITIONAL CELL RECONFIGURATION INITIATED BY A MASTER NODE

(71) Applicant: ZTE Corporation, Shenzhen (CN)

(72) Inventors: Mengjie Zhang, Shenzhen (CN); He Huang, Shenzhen (CN); Jing Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 308 days.

(21) Appl. No.: 18/240,902

(22) Filed: Aug. 31, 2023

(65) Prior Publication Data

US 2023/0413153 A1 Dec. 21, 2023

Related U.S. Application Data

(63) Continuation of application No. PCT/CN2021/110745, filed on Aug. 5, 2021.

(51) Int. Cl.
| | |
|---|---|
| *H04W 36/36* | (2009.01) |
| *H04W 36/00* | (2009.01) |
| *H04W 76/20* | (2018.01) |

(52) U.S. Cl.
CPC ..... *H04W 36/362* (2023.05); *H04W 36/0058* (2018.08); *H04W 36/0069* (2018.08); *H04W 76/20* (2018.02); *H04W 36/00835* (2018.08)

(58) Field of Classification Search
None
See application file for complete search history.

(56) References Cited

U.S. PATENT DOCUMENTS

| | | | | |
|---|---|---|---|---|
| 2021/0099926 A1* | 4/2021 | Chen | .................. | H04W 36/362 |
| 2021/0105681 A1 | 4/2021 | Paladugu et al. | | |
| 2021/0120475 A1* | 4/2021 | Yang | .................... | H04W 76/11 |
| 2022/0369172 A1* | 11/2022 | Hwang | ............ | H04W 36/0079 |
| 2025/0097788 A1* | 3/2025 | Watanabe | ......... | H04W 36/0069 |

FOREIGN PATENT DOCUMENTS

| | | |
|---|---|---|
| JP | 2021/092160 | 5/2021 |
| JP | 2023-500072 | 1/2023 |
| WO | 2021109389 A1 | 6/2021 |

OTHER PUBLICATIONS

International Search Report and Written Opinion for International Application No. PCT/CN2021/110745, mailed on Apr. 26, 2022, 8 pages.
CATT, "TS 37.340 CR for CPA and inter-SN CPC," 3GPP TSG-RAN WG2 Meeting #114-e, R2-2105062, E-meeting, May 19-27, 2021.
Futurewei, "Discussion on the procedure of SN initiated CPC," 3GPP TSG-RAN WG2 Meeting #114-e, R2-2105012, E-Conference, May 19-27, 2021.

(Continued)

*Primary Examiner* — Xavier S Wong
(74) *Attorney, Agent, or Firm* — Perkins Coie LLP

(57) ABSTRACT

In wireless communication, a device may change, add, or handover between providers (e.g. nodes) of network access. This may include a conditional cell addition/change procedure initiated by a master node. In addition, successive cell addition/changes can also be performed. The conditional procedures and/or successive procedures can reduce handover interruption time and improve reliability.

20 Claims, 11 Drawing Sheets

(56) References Cited

OTHER PUBLICATIONS

Ericsson, "Conditional PSCell Addition Change", 3GPP TSG-RAN WG2 Meeting #114-e, R2-2105897, Electronic meeting, May 19-May 27, 2021.

Extended European Search Report for European Patent Application No. 21952282.8, mailed Aug. 30, 2024 (18 pages).

Apple Inc., "Return CHO Configuration," 3GPP TSG-RAN WG2 Meeting #109 electronic, R2-2000592, Elbonia, Feb 24-Mar. 6, 2020 (6 pages).

CATT, "Summary of [AT113-e][231][eDCCA] Solution alternatives for CPAC (CATT)," 3GPP TSG-RAN WG2 Meeting #113 electronic, R2-2101970, Online, Jan. 25-Feb. 5, 2021 (30 pages).

Office Action for co-pending JP Appl. No. 2024-506490, dated Dec. 26, 2024, 4 pages with unofficial English summary.

Futurewei, "Discussion on the procedure of SN initiated CPC" 3GPP TSG-RAN WG2 Meeting #114-e E-Conference, May 19-27, 2021, R2-2105012, 7 pages.

* cited by examiner

Figure 5A:
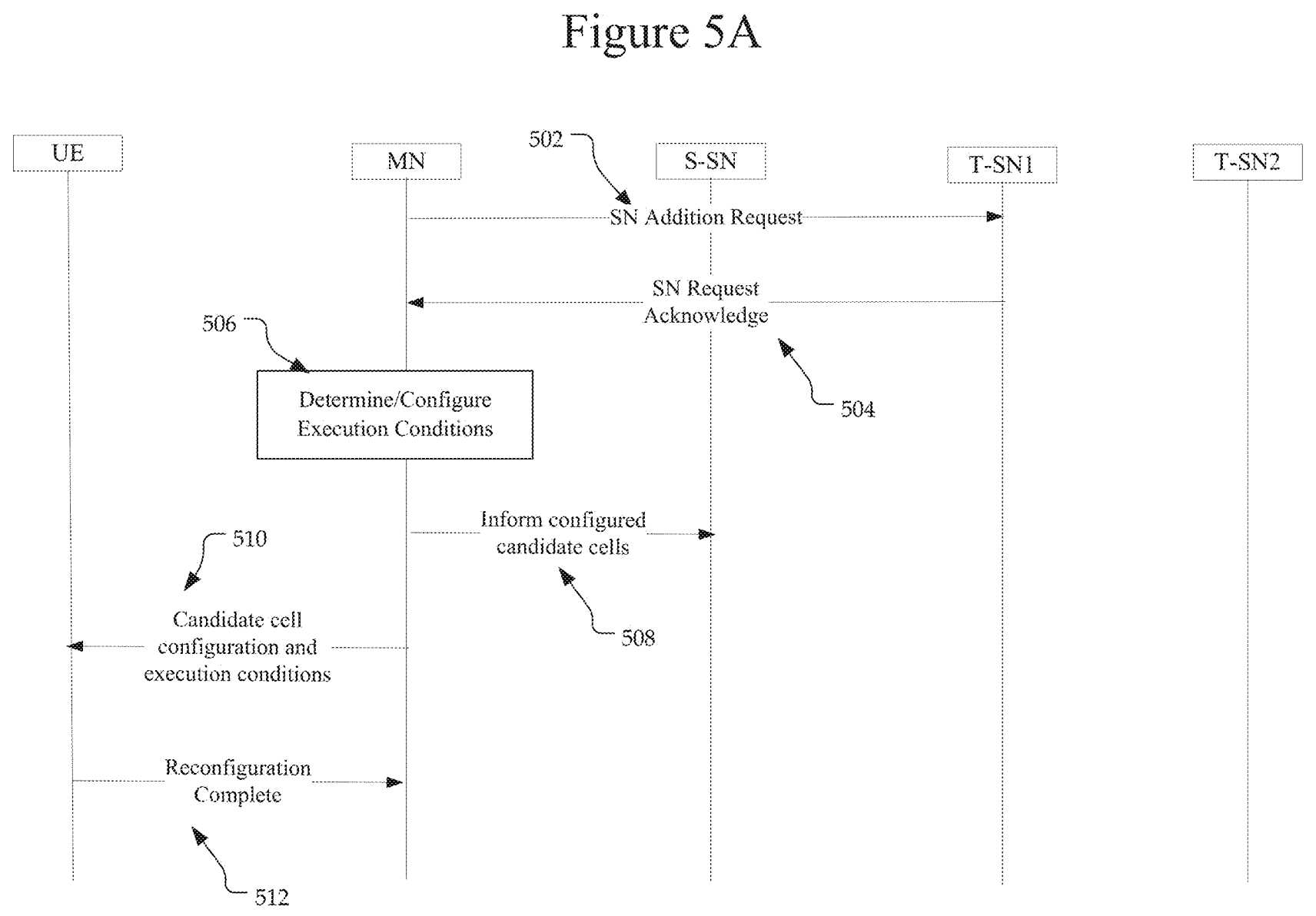

| UE | MN | S-SN | T-SN1 | T-SN2 |

502 — SN Addition Request

504 — SN Request Acknowledge

506 — Determine/Configure Execution Conditions

508 — Inform configured candidate cells

510 — Candidate cell configuration and execution conditions

512 — Reconfiguration Complete

CONDITIONAL CELL RECONFIGURATION INITIATED BY A MASTER NODE

CROSS REFERENCE TO RELATED APPLICATIONS

This patent document is a continuation of and claims benefit of priority to International Patent Application No. PCT/CN2021/110745, filed on Aug. 5, 2021. The entire content of the before-mentioned patent application is incorporated by reference as part of the disclosure of this application.

TECHNICAL FIELD

This document is directed generally to wireless communications. More specifically, in a mobile device communications system, there may be an enhanced conditional cell addition/change procedure initiated by a master node.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. In order to improve communications and meet reliability requirements for the vertical industry as well as support the new generation network service, communication improvements should be made.

SUMMARY

This document relates to methods, systems, and devices for changing, adding, or a handover between providers (e.g. nodes) of network access in a wireless communication environment. This may include a conditional cell addition/change procedure and/or a conditional handover procedure. In addition, successive cell addition/changes or successive handovers can also be performed. Conditional mobility enhancements may reduce handover interruption time, improve mobility reliability, and/or enable successive conditional handover or conditional cell changes/additions.

In one embodiment, a method for wireless communication includes sending, by the mater node ("MN") to a target secondary node, a secondary node ("SN") addition request for a SN change from a source SN or a SN addition of the target SN, wherein the request comprises candidate cell information for the target SN; receiving, by the MN from the target SN, a response that includes a candidate cell configuration; and sending, by the MN to a user equipment ("UE"), a radio resource control ("RRC") message with at least one of the candidate cell configuration and one or more execution conditions for each candidate cell to cause a change from the source SN to the target SN or a SN addition based on the candidate cell configuration when the one or more execution conditions for the candidate cell associated with the target SN are met. The candidate cell information comprises one or more candidate primary secondary cell ("PSCell") identification information. The MN provides measurement results of one or more cells in the target SN, and wherein the measurement results for each cell include an indicator for whether the cell is a candidate PSCell. The method includes sending, by the MN to the source SN, the candidate cell identification information selected by the target SN, in response to receiving a response that includes candidate cell configuration from the target SN. The method includes receiving, by the MN from the UE, a RRC complete message to confirm the reception of the RRC message with the candidate cell configuration. The method includes sending, by the MN to the source SN, the candidate cell identification information selected by the target SN, in response to receiving the RRC complete message from the UE. The candidate cell information comprises one or more candidate cell identification information that have been configured as a candidate PSCell. The SN addition request to a target SN comprises at least one of an indication to indicate a SN change from the target SN back to the source SN after execution of a SN change to one target SN is allowed, or an indication to indicate a SN change from the target SN to other target SNs after execution of a SN change to one target SN is allowed. The candidate cell configuration include the execution condition for at least one of a source PSCell, or the candidate cell that has been configured as a PSCell candidate. The RRC message comprises an indication for each candidate cell configuration to indicate whether the candidate cell configuration is maintained after completion of the change from the source SN to the target SN. The RRC message comprises an indication to indicate whether the execution condition for each candidate cell or for the indicated candidate cell is maintained after completion of the change from the source SN to the target SN. The method includes receiving, by the MN from the UE, a RRC complete message to inform the execution of the change from the source SN to the target SN, wherein the RRC complete message including a second RRC complete message sent to the target SN. The second RRC complete message sent to the target SN comprises the candidate PSCell identification information whose candidate cell configuration is maintained at the UE side.

In another embodiment, a method for wireless communication includes receiving, by a target secondary node from a master node ("MN"), a secondary node ("SN") addition request for a SN change from a source SN or a SN addition, wherein the request comprises candidate cell information for the target SN; sending, by the target SN to the MN, a response that includes candidate cell configuration. The MN sends to a user equipment ("UE"), a radio resource control ("RRC") message with at least one of the candidate cell configuration and one or more execution conditions for each candidate cell to cause a change from the source SN to the target SN based on the candidate cell configuration when the one or more execution conditions for the associated candidate cell are met. The candidate cell information comprises one or more candidate primary secondary cell ("PSCell") identification information. The MN provides measurement results of one or more cells in the target SN, and wherein the measurement results for each cell include an indicator for whether the cell is a candidate PSCell. The MN sends to the source SN, the candidate cell identification information selected by the target SN, in response to receiving a response that includes candidate cell configuration from the target SN. The MN receives from the UE, a RRC complete message to confirm the reception of the RRC message with the candidate cell configuration, and wherein the MN sends to the source SN, the candidate cell identification information selected by the target SN, in response to receiving a RRC complete message from the UE. The candidate cell information comprises one or more candidate cell identification information that have been configured as a candidate PSCell. The SN addition request to a target SN comprises at least one of an indication to indicate a SN change from the target SN back to the source SN after execution of a SN change to one target SN is allowed, or an indication to indicate a SN change from the target SN to other target SNs after execution of a SN change to one target SN is allowed. The candidate cell configuration include the execution condition for at least one of a source PSCell, or the candidate cell that has been configured as a PSCell candidate. The RRC message comprises an indication for each candidate cell configuration to indicate whether the candidate cell configuration is maintained after completion of the change from the source SN to the target SN. The RRC message comprises an indication to indicate whether the execution condition for each candidate cell or for the indicated candidate cell is maintained after completion of the change from the source SN to the target SN. The method includes receiving, by the target SN from the UE via the MN, a RRC complete message to inform the execution of the change from the source SN to the target SN, wherein the RRC complete message comprises the candidate PSCell identification information whose candidate cell configuration is maintained at the UE side.

In another embodiment, a method for wireless communication includes receiving, by a user equipment ("UE") from a mater node ("MN"), a radio resource control ("RRC") message with at least one of the candidate cell configuration and one or more execution conditions for each of the at least one candidate cell, and performing, by a UE, a change from the source secondary node to the target secondary node based on the candidate cell configuration when the one or more execution conditions for the associated candidate cell are met. The RRC message comprises an indication for each candidate cell configuration to indicate whether the candidate cell configuration is maintained after completion of the change from the source secondary node to the target secondary node. The RRC message comprises an indication to indicate whether the execution condition for each candidate cell or for the indicated candidate cell is maintained after completion of the change from the source secondary node to the target SN. The method includes sending, by the UE to the MN, a RRC complete message to inform the execution of the change from the source secondary node to the target secondary node, wherein the RRC complete message including a second RRC complete message sent to the target secondary node. The second RRC complete message sent to the target secondary node comprises the candidate PSCell identification information whose candidate cell configuration is maintained at the UE side.

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

BRIEF DESCRIPTION OF THE DRAWINGS

FIG. 4A shows an embodiment of a secondary node (SN) initiated cell change procedure.

FIG. 4B shows additional features of the secondary node (SN) initiated cell change procedure shown in FIG. 4A.

FIG. 5A shows an embodiment of a master node (MN) initiated cell change procedure.

DETAILED DESCRIPTION

Figure 1:
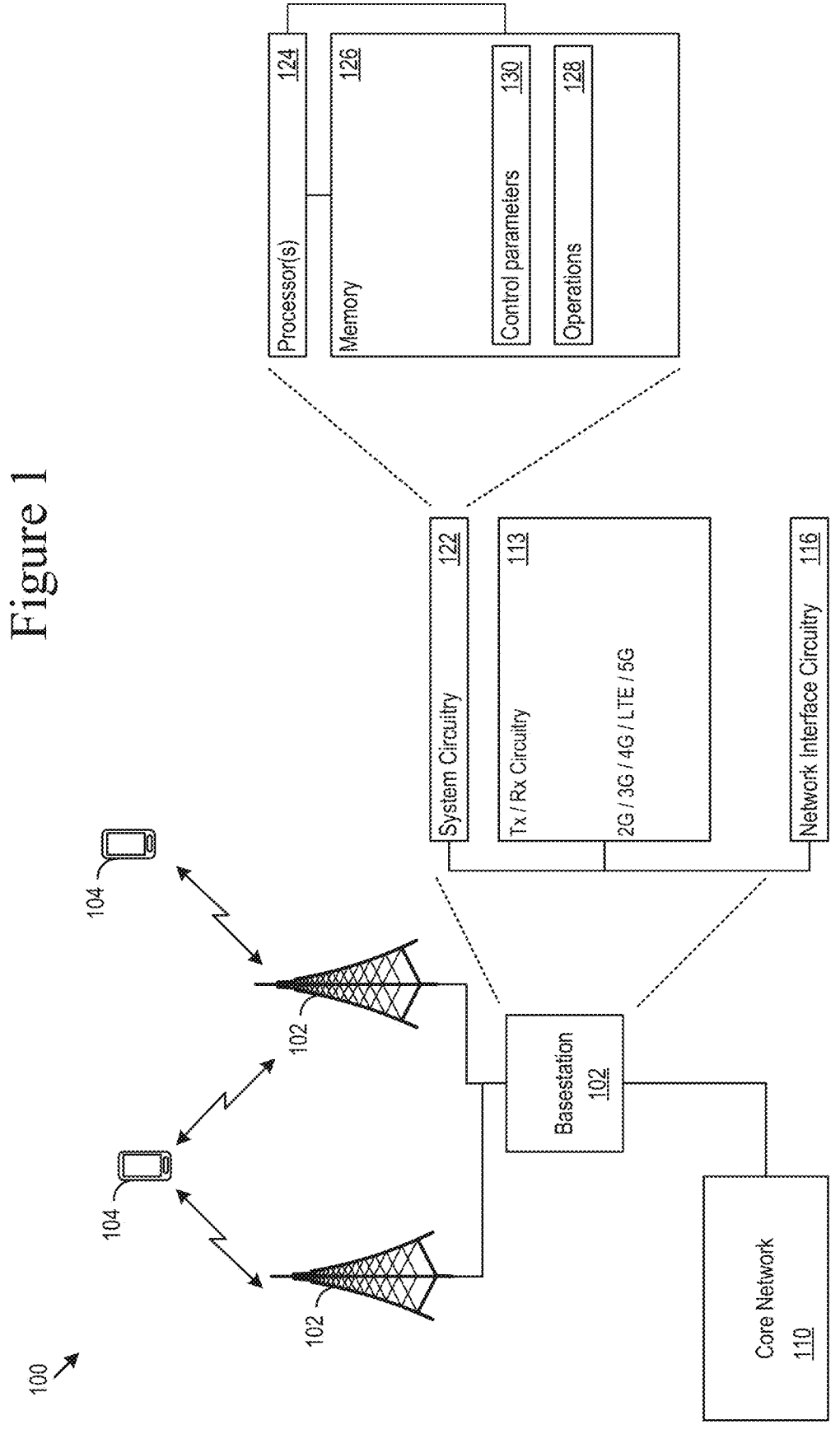
FIG. 1 shows an example basestation.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Radio resource control ("RRC") is a protocol layer between UE and the basestation at the IP level (Network Layer). There may be various Radio Resource Control (RRC) states, such as RRC connected (RRC_CONNECTED), RRC inactive (RRC_INACTIVE), and RRC idle (RRC_IDLE) state. RRC messages are transported via the Packet Data Convergence Protocol ("PDCP"). As described, UE can transmit data through a Random Access Channel ("RACH") protocol scheme or a Configured Grant ("CG") scheme. CG may be used to reduce the waste of periodically allocated resources by enabling multiple devices to share periodic resources. The basestation or node may assign CG resources to eliminate packet transmission delay and to increase a utilization ratio of allocated periodic radio resources. The CG scheme is merely one example of a protocol scheme for communications and other examples, including but not limited to RACH, are possible. The wireless communications described herein may be through radio access.

As described below with respect to FIGS. 1-3B, a network provider may include a number of network nodes (i.e. basestations) for providing network access to a user equipment ("UE") device. The network nodes are referred to as basestations in some embodiments. There may be a master node ("MN") and one or more secondary nodes ("SN"). The MN may include a master cell group ("MCG") and the SN may each include a secondary cell group ("SCG"). The MCG is the group of cells provided by the master node ("MN") and the SCG is the group of cells provided by the secondary node ("SN"). The MCG may include a primary cell ("PCell") and one or more secondary cells ("SCell"). The SCG may include a primary secondary cell ("PSCell") and one or more secondary cells ("SCell"). Each primary cell may be connected with multiple secondary cells. The primary cells (PCell, PSCell) are the master cells of their respective groups (MCG, SCG, respectively) and may initiate initial access. The primary cells may be used for signaling and may be referred to as special cell ("spCell") where spCell=PCell+PSCell.

A user equipment ("UE") device may move between nodes or cells in which case a handover or a change/addition operation may occur to improve network reliability for the UE as it moves. The movement may be from a source secondary node to a target secondary node. There may be a number of potential target secondary nodes that are referred to as candidates. Likewise, the movement between cells may also include a number of target cells that are potential candidate cells. A conditional handover ("CHO") and a conditional PSCell addition/change ("CPAC") are described below. The CPAC may include a conditional PSCell change ("CPC") and/or a conditional PSCell addition ("CPA").

A conditional handover ("CHO") can reduce handover interruption time and improve mobility reliability. A CHO is a handover that is executed by the UE when one or more execution conditions are met. The UE can evaluate the execution condition(s) upon receiving the CHO configuration, and can stop evaluating the execution condition(s) once the handover is triggered. The CHO configuration may include a candidate PCell configuration generated by a candidate target node and the corresponding execution condition(s) for that candidate cell.

A conditional PSCell addition/change ("CPAC") may include the UE having a network configuration for initiating access to a candidate PSCell, either to consider whether the PSCell is suitable for SN addition or SN change including an intra-SN change. This consideration may be based on configured condition(s). The UE in the wireless network can operate in dual connectivity ("DC"), including intra-E-UTRA DC or Multi-Radio DC ("MR-DC"). In the example of intra-E-UTRA DC, both the MN and SN provide E-UTRA access. While in the example of MR-DC, one node may provide new radio ("NR") access and the other one provides either E-UTRA or NR access.

In CPAC/CHO, some inter-node interaction may allow for the transfer of suggested candidate cell(s) information, execution condition(s), and/or accepted candidate cell(s) information between the MN, source SN, and target SN. Due to the deployment of high frequency and smaller cell size, PCell/PSCell changes may occur frequently in NR. Accordingly, successive handovers or PSCell changes may be required to reduce handover interruption time and improve mobility reliability. As described below, conditional mobility enhancements may reduce handover interruption time, improve mobility reliability, and/or enable successive CHO/CPAC.

FIG. 1 shows an example basestation 102. The basestation may also be referred to as a wireless network node and may be the network nodes (e.g. master node ("MN"), secondary node ("SN"), and the source/target nodes) shown in FIGS. 3A-7B. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

Figure 2:
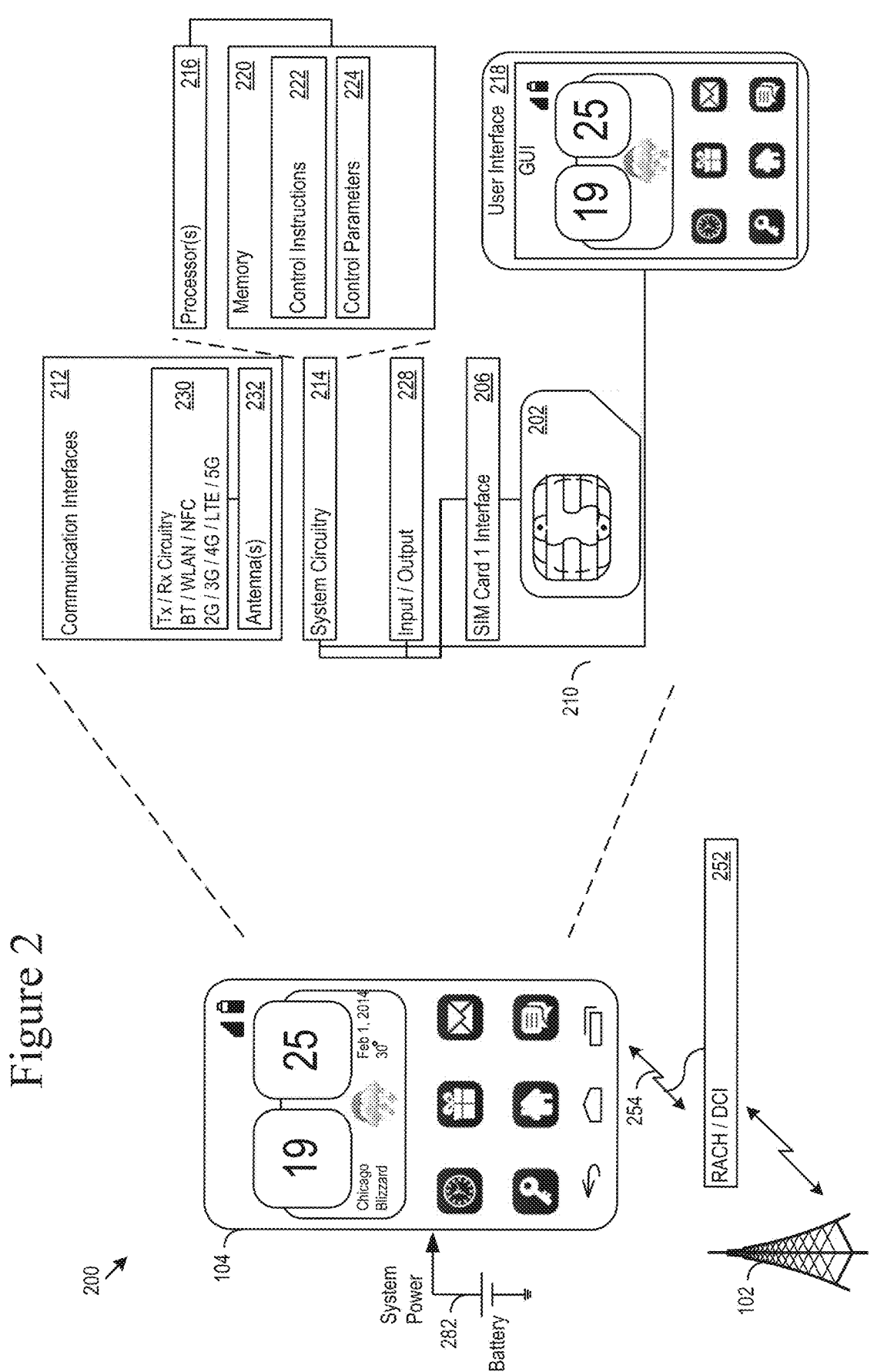
FIG. 2 shows an example random access (RA) messaging environment.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Figure 3A:
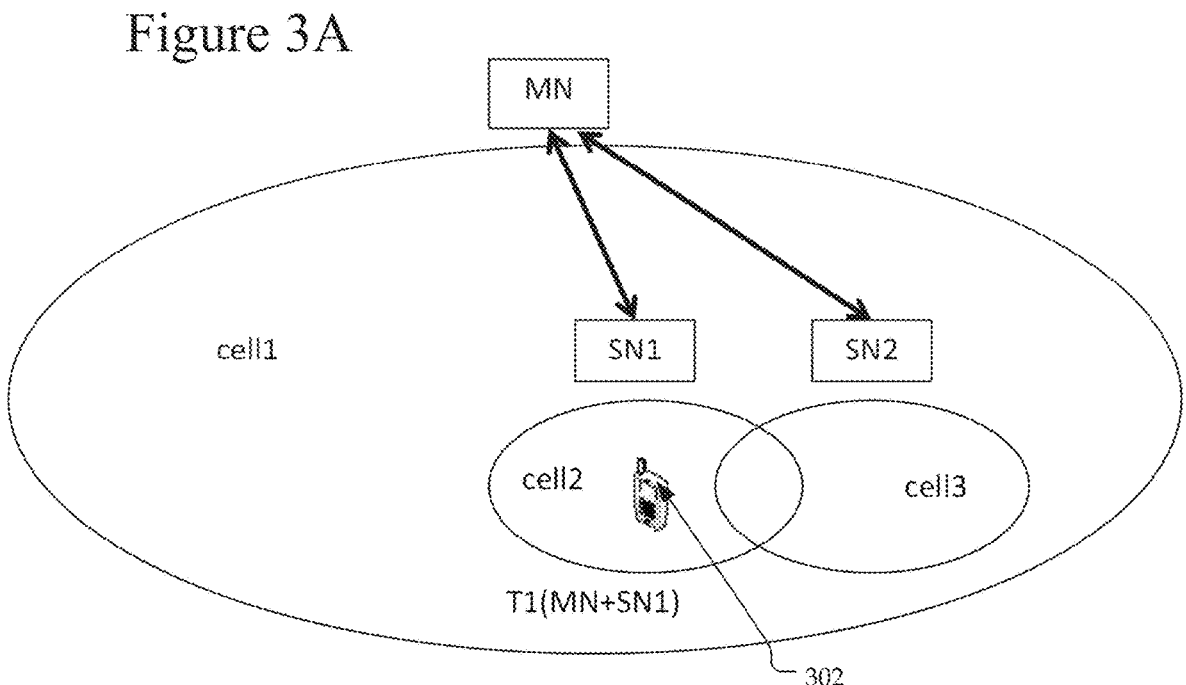
FIG. 3A shows an embodiment of a user equipment (UE) communicating with nodes.
Figure 3B:
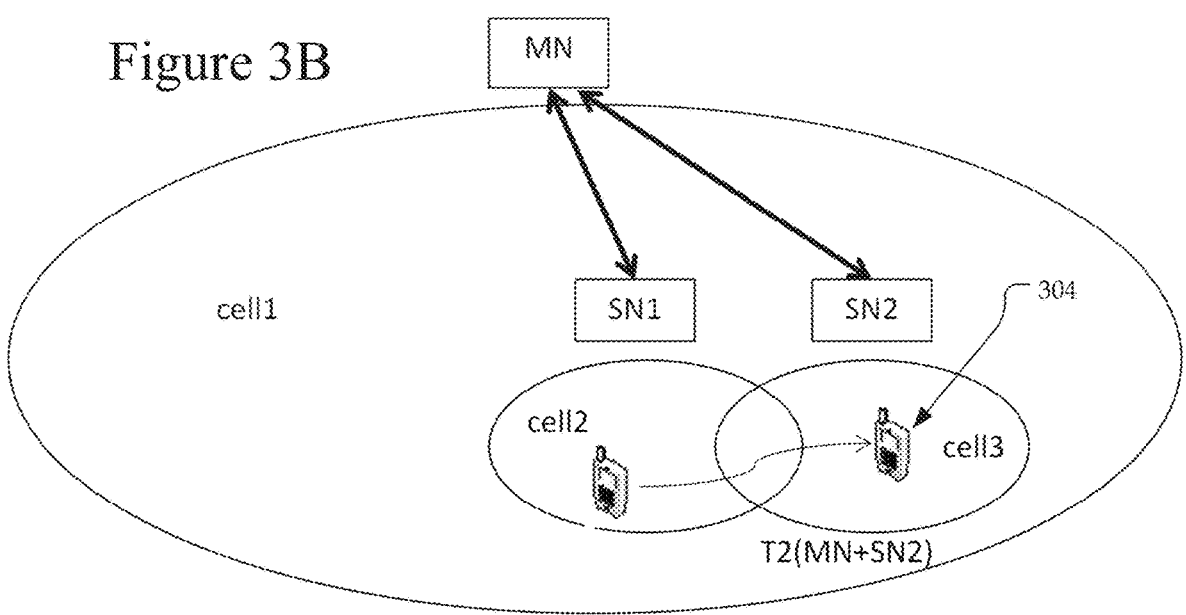
FIG. 3B shows an embodiment of the user equipment (UE) changing secondary nodes.

Multiple RAN nodes of the same or different radio access technology ("RAT") (e.g. eNB, gNB) can be deployed in the same or different frequency carriers in certain geographic areas, and they can inter-work with each other via a dual connectivity operation to provide joint communication services for the same target UE(s). The multi-RAT dual connectivity ("MR-DC") architecture may have non-co-located master node ("MN") and secondary node ("SN"). On embodiment is shown in FIGS. 3A-3B. Access Mobility Function ("AMF") and Session Management Function ("SMF") may the control plane entities and User Plane Function ("UPF") is the user plane entity in new radio ("NR") or SGC. The signaling connection between AMF/SMF and the master node ("MN") may be a Next Generation-Control Plane ("NG-C")/MN interface. The signaling connection between MN and SN may an Xn-Control Plane ("Xn-C") interface. The signaling connection between MN and UE is a Uu-Control Plane ("Uu-C") RRC interface. All these connections manage the configuration and operation of MR-DC. The user plane connection between User Plane Function ("UPF") and MN may be NG-U(MN) interface instance.

FIG. 3A shows an embodiment of a user equipment (UE) communicating with nodes. The master node ("MN") generates a first cell cell1. There are two secondary nodes ("SN") labeled as SN1 and SN2. The cell for SN1 is cell2 and the cell for SN2 is cell3. Each of the three network nodes provides a corresponding cell for user equipment ("UE") to connect to the network. The UE 302 is shown at a first time T1 within range of MN and SN1. As shown, the UE 302 is operating in dual connectivity ("DC") between MN and SN1.

FIG. 3B shows an embodiment of the user equipment (UE) changing secondary nodes. The UE 304 is shown as moving from time T1 (where it was in cell2) to be in cell3 at time T2, where it is in cell3 or MN+SN2. With the movement of the UE from 302 to 304 as shown in FIG. 3A to FIG. 3B, the SN is changed from SN1 to SN2. As described below, SN change can be initiated either by the MN or the source SN. In FIG. 3B, SN1 is the source SN and SN2 is the target SN.

Figure 4A:
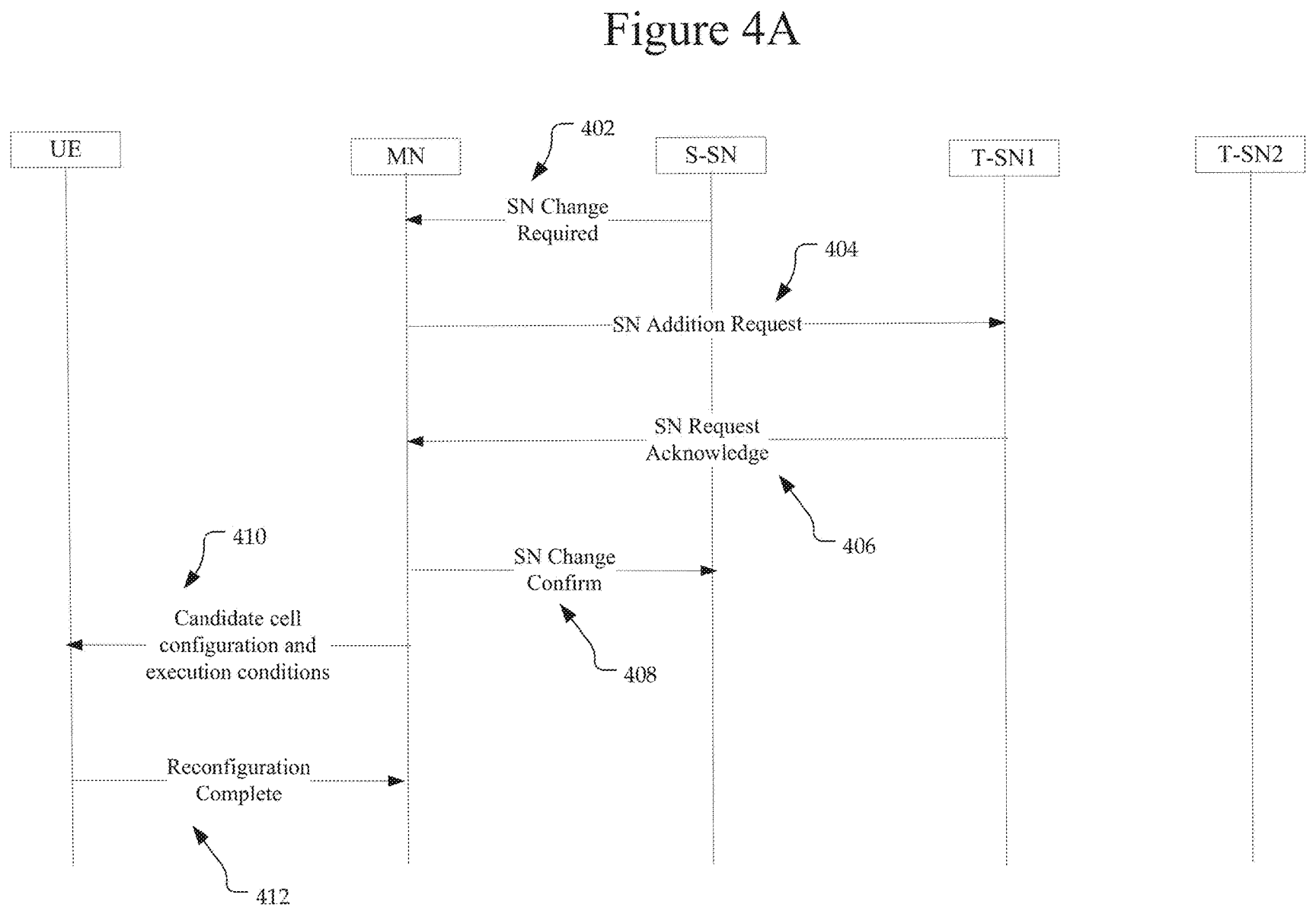
Figure 4B:
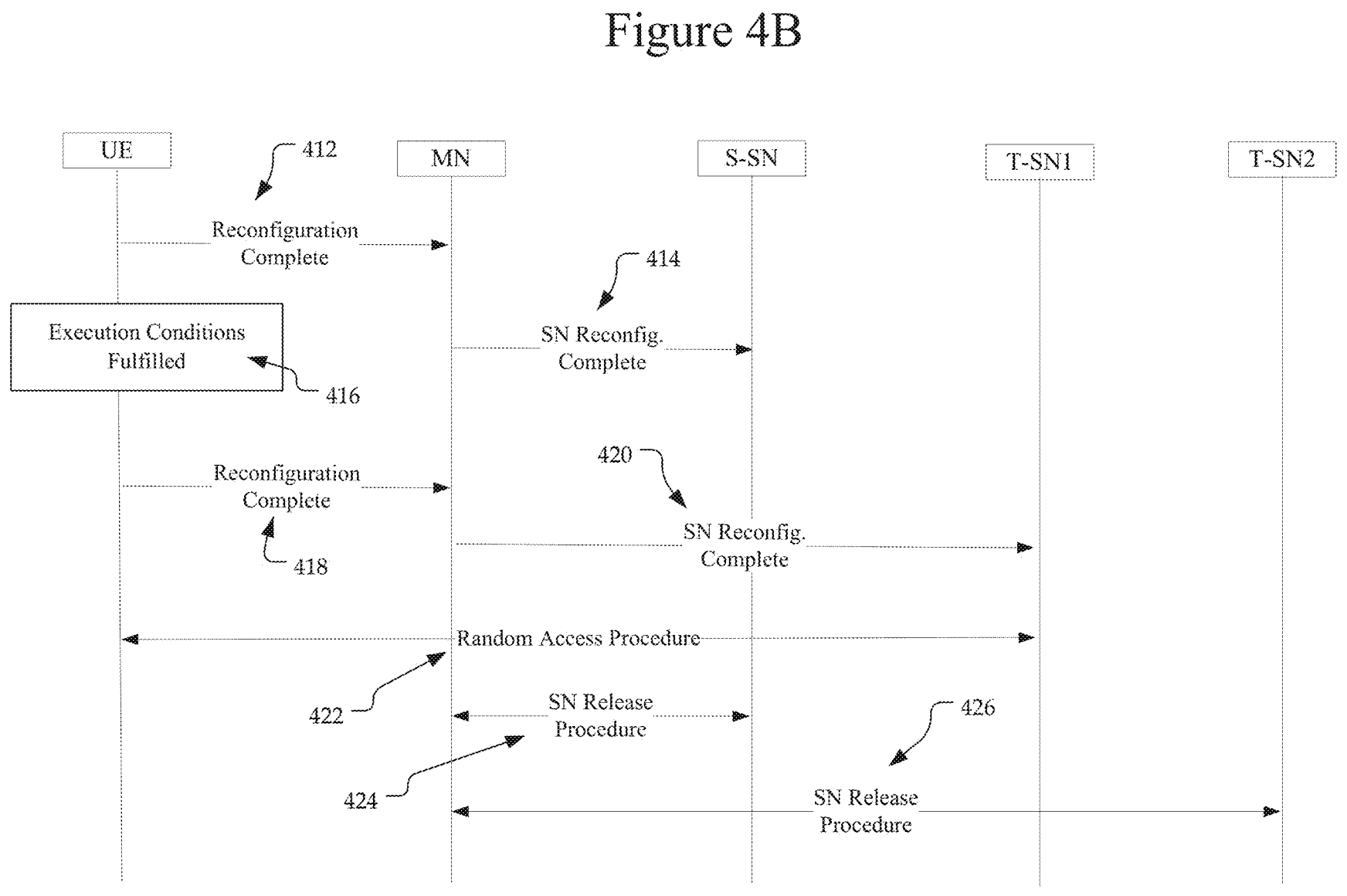
Figure 5B:
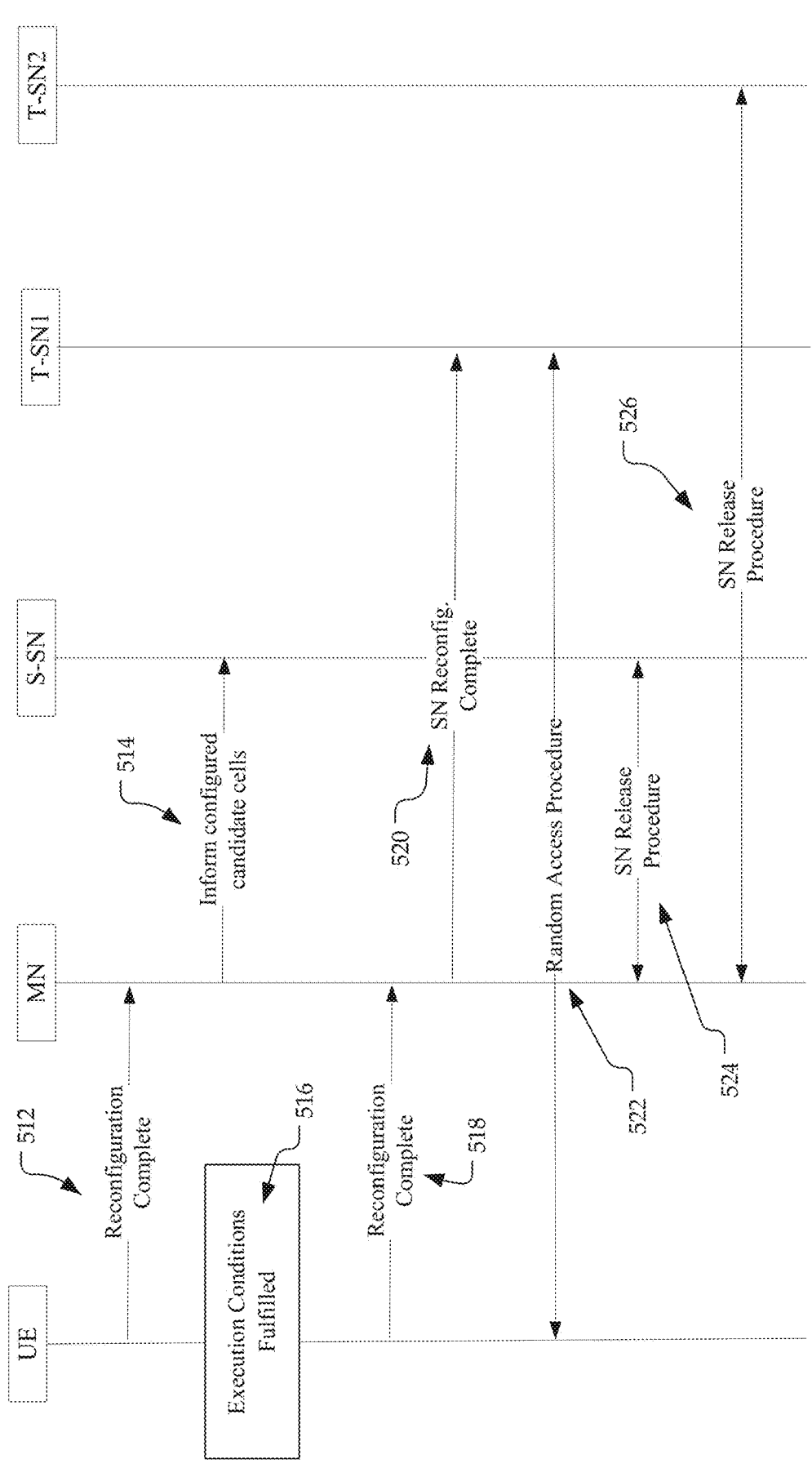
FIG. 5B shows additional features of the master node (MN) initiated cell change procedure shown in FIG. 5A.

To reduce interruption time and improve mobility reliability during a SN change or SN addition, a Conditional PSCell Addition/Change ("CPAC") is described. CPAC may include a PSCell addition/change that is executed by the UE when one or more execution conditions are met. The UE evaluates the one or more execution conditions upon receiving the CPAC configuration, and stops evaluating the one or more execution conditions once a PSCell addition/change is triggered. The CPAC configuration may include the candidate PSCell configuration generated by the candidate SN and the corresponding one or more execution conditions for candidate PSCell. The CPAC procedure may be initiated by the SN as shown in FIGS. 4A-4B, or may be initiated by the MN as shown in FIGS. 5A-5B. In other embodiments, the CPAC procedure can be classified as CPAC with MN involvement, or CPAC without MN involvement when there is intra-SN CPAC without MN involvement.

SN Initiated CPAC Procedure

FIG. 4A shows an embodiment of a secondary node (SN) initiated cell change procedure. FIG. 4A illustrates the communication between the user equipment ("UE"), the master node ("MN"), the source secondary node ("S-SN"), a first target secondary node ("T-SN1"), and a second target secondary node ("T-SN2"). The source secondary node S-SN initiates the conditional SN change procedure by sending a SN change required message 402 to the MN. In this message, the source SN may include a suggested candidate PSCell identification information, a corresponding execution condition (or conditions), the measurement results related to the target SN, and/or a CPAC indication to indicate that it is a conditional based procedure. The source SN may also include the updated source SCG configuration (e.g. measurement configuration) to the MN.

The change required message 402 from S-SN to the MN may include a list of suggested CPAC candidate cells. The list of candidate cells may include a candidate cell ID, CGI, and/or PCI+frequency. The list of candidate cells may further include a list of execution conditions. The list of execution conditions may include each execution condition being linked with a corresponding candidate cell (e.g. candidate cell ID, CGI, PCI+frequency), and/or include the execution conditions where the entry order of each item in the execution condition list is the same as the entry order of each item in the candidate cell list. The change required message 402 from S-SN to the MN may include an indicator included in the measurement results list provided by the source SN (i.e. candidateCellInfoListSN) to indicate whether the indicated cell is suggested as a CPAC candidate cell or not. The list may include a list of cell identifiers and corresponding measurements for that list. The items included in the change required message 402 from the S-SN to the MN may be transferred by including each item as one information element (IE) in a Xn/X2 message, e.g. in the SN(SgNB) Change Required message. Alternatively, the items included in the change required message 402 from the S-SN to the MN may be transferred by including each item in a RRC message, e.g. CG-Config message. The RRC message may be included as one IE in a Xn/X2 message, e.g. SN(SgNB) Change Required message.

The MN sends a SN addition request message 404 to the target secondary node T-SN1. In this message, the MN may include the candidate PSCell identification information (suggested candidate) suggested by the source SN, the measurement results related to the target SN and/or a CPAC indication to indicate this is a conditional based procedure. T-SN1 responds to the SN Addition Request 404 with a SN addition request acknowledge message 406 to the MN. The acknowledge message 406 includes the candidate PSCell(s) configuration and/or the selected candidate PSCell identification information.

The MN sends a SN change confirm message 408 (or other Xn/X2 message) to the source secondary node S-SN. The change confirm message 408 includes the candidate PSCell identification information accepted/rejected by the target secondary node T-SN1. After reception of the change confirm message 408, S-SN may initiate a SN modification procedure to update the S-SN configuration (e.g. measurement configuration, execution condition(s)).

The MN sends a reconfiguration message 410 to the UE. The reconfiguration message 410 may be a RRCReconfiguration message that includes the CPAC configuration for the UE. The CPAC configuration may include at least the candidate PSCell configuration generated by the T-SN1 and the corresponding execution condition(s) generated by the S-SN. The UE replies to the reconfiguration message 410 to the MN to confirm the reception of the reconfiguration message with a reconfiguration complete message 412. The reconfiguration complete message 412 may be a RRCReconfigurationComplete message that includes an embedded RRCReconfigurationComplete message to the S-SN. The remaining communications for the SN initiated change procedure are shown in FIG. 4B.

FIG. 4B shows additional features of the secondary node (SN) initiated cell change procedure shown in FIG. 4A. After the reconfiguration complete message 412, the MN sends a SN reconfiguration complete message 414 to the source SN, if the SN reconfiguration complete 410 message is received.

The UE keeps connection with the S-SN and starts evaluating the one or more execution condition(s) 416. When at least one execution condition for a candidate PSCell is met, the UE can select the related cell as a target PSCell and triggers the execution of CPAC to access to the target SN T-SN1. At the execution of CPAC, the UE sends a reconfiguration complete message 418 to the MN. The reconfiguration complete message 418 may be a RRCReconfigurationComplete message to the MN including an embedded RRCReconfigurationComplete to the target SN. In some embodiments, the MN may transfer a SN reconfiguration complete message 420 to the target SN T-SN1.

The UE performs a Random Access procedure 422 towards the target PSCell of the target SN T-SN1. The order the UE sends the RRCReconfigurationComplete message 418 and performs the Random Access procedure 422 towards the target SN may be varied. The MN initiates a SN release procedure 424 towards the source SN S-SN to release the S-SN resources. The MN initiates a SN Release procedure 426 towards other candidate SNs (T-SN2) to release the reserved candidate (T-SN2) PSCell resources.

In some embodiments, the MN shall not send the change confirm message 408 to the S-SN after the SN addition procedure because the MN shall inform the accepted/configured/rejected candidate PSCell identification information to the S-SN via SN reconfiguration complete message (or other Xn/X2 message) as part of the SN reconfiguration complete message 420.

Referring back to the change required message 402 from S-SN to the MN that may include a list of suggested CPAC candidate cells, a list of execution conditions, and/or an indication of whether the cell is a CPAC candidate. The S-SN includes one list for candidate cell identifiers (e.g. candidateCellListCPCSN), one list for execution conditions (e.g. condExecutionCondListCPCSN) and one list for measurements (i.e. candidateCellInfoListSN) in a CG-Config message to the MN. The entry order of each item in the execution condition list (e.g. condExecution-CondListCPCSN) may be the same as entry order of each item in candidate cell identifier list (e.g. candidateCellInfo-ListCPCSN). The following is an example of code for this embodiment:

```
CG-Config-IEs ::=                          SEQUENCE {
  [...]
    candidateCellInfoListSN                      OCTET STRING (CONTAINING MeasResultList2NR)
  OPTIONAL,
  [[
    candidateCellListCPCSN-r17               CandidateCellList-CPC            OPTIONAL,
    condExecutionCondListCPCSN-r17              CondExecutionCondList-CPC
  OPTIONAL,
  ]]
  CandidateCellList-CPC ::=                   SEQUENCE (SIZE (1..FFS)) OF CandidateCellInfo
  CondExecutionCondList-CPC ::=                       SEQUENCE (SIZE (1..FFS)) OF
```

-continued

```
CondExecutionCond2-r17
CandidateCellInfo ::=                    SEQUENCE {
    ssbFrequency                         ARFCN-ValueNR                    OPTIONAL,
    candidateCellList                    SEQUENCE (SIZE (1..FFS)) OF PhysCellId OPTIONAL,
}
CondExecutionCond2-r17 ::=                                           SEQUENCE (SIZE (1..FFS)) OF
CondExecutionCond3-r17
CondExecutionCond3-r17                   OCTET STRING (CONTAINING CondReconfigExecCond-r17)
    OPTIONAL
CondReconfigExecCond-r17 ::= SEQUENCE (SIZE (1..2)) OF MeasId
```

The S-SN includes one list for candidate cell identifiers and the corresponding execution conditions (e.g. candidate-CellListCPCSN), and one list for measurements (i.e. candidateCellInfoListSN) in CG-Config message to the MN. This may combines execution conditions and candidate cell list, but does not include the indicator. The following is an example of code for this embodiment:

```
CG-Config-IEs ::=                        SEQUENCE {
[...]
    candidateCellInfoListSN                  OCTET STRING (CONTAINING MeasResultList2NR)
OPTIONAL,
[[
    candidateCellInfoListCPCSN-r17           CandidateCellInfoList-CPC
    OPTIONAL,
]]
CandidateCellInfoList-CPC ::=                                SEQUENCE (SIZE (1..FFS)) OF
CandidateCellInfo
CandidateCellInfo ::=                    SEQUENCE {
    ssbFrequency                         ARFCN-ValueNR            OPTIONAL,
    candidateCellList                    SEQUENCE (SIZE (1..FFS)) OF CandidateCellInfo2
OPTIONAL,
}
CandidateCellInfo2::=                    SEQUENCE {
    physCellId                                          PhysCellId
OPTIONAL,
    condExecutionCond2-r17               OCTET STRING (CONTAINING CondReconfigExecCond-r17)
    OPTIONAL
}
CondReconfigExecCond-r17 ::= SEQUENCE (SIZE (1..2)) OF MeasId
```

The S-SN includes one list for candidate cell identifiers and the corresponding execution conditions (e.g. candidate-CellListCPCSN) to the MN, and adds an indicator in the existing measurements list (i.e. candidateCellInfoListSN) within the CG-Config message to indicate whether the cell is a CPC candidate cell or not. In other words, this combines the candidate cell list and the execution conditions. In one example, the list for candidate cell identifiers and the corresponding execution conditions (e.g. candidateCell-ListCPCSN) may be the same as that shown above. The example of indicator in measurements list is shown as below:

```
CG-ConfigInfo-IEs ::=                    SEQUENCE {
[...]
        candidateCellInfoListSN              OCTET STRING (CONTAINING MeasResultList2NR)
OPTIONAL,
[...]
}
[...]
-- ASN1START
-- TAG-MEASRESULT2NR-START
MeasResult2NR ::=                        SEQUENCE {
        ssbFrequency                     ARFCN-ValueNR                    OPTIONAL,
        refFreqCSI-RS                    ARFCN-ValueNR                    OPTIONAL,
        measResultServingCell            MeasResultNR                     OPTIONAL,
        measResultNeighCellListNR        MeasResultListNR                 OPTIONAL,
]
        ...
}
    MeasResultListNR ::=                 SEQUENCE (SIZE (1..maxCellReport)) OF
MeasResultNR
MeasResultNR ::=                         SEQUENCE {
        physCellId                                                       PhysCellId
OPTIONAL,
```

-continued

```
[...]
[[
    cpcCandidate-r17          ENUMERATED {true}                          OPTIONAL,
]],
}
```

If multiple candidate SNs are prepared via one SN initiated CPAC procedure, the SN change required message 402 may include a list of candidate SNs information (e.g. a list of candidate SN IDs, or/and a list of candidate PSCells information for each candidate SN). There are several options for transferring the suggested candidate SNs information to the MN, including the S-SN sends a list of CG-Config message to the MN, and each CG-Config message is linked with the candidate SN ID. In another option, the S-SN sends one CG-Config message to the MN that includes multiple candidate cell lists, execution condition lists, or/and measurement result lists, and each list is linked with the corresponding candidate SN ID.

Referring back to FIG. 4A, when the MN sending a SN addition request message 404 to the target secondary node T-SN1, this message may include the candidate PSCell identification information (suggested candidate) suggested by the source SN, the measurement results related to the target SN and/or a CPAC indication to indicate this is a conditional based procedure. There may be further inter-node interaction between the MN and T-SN1. The SN addition request message 404 includes at least a list of candidate cells (e.g. candidate cell ID, CGI, frequency+PCI) as suggested by S-SN. This list may be transferred from the MN to the T-SN1 by either including the item as one IE in a Xn/X2 message, e.g. SN(SgNB) Addition Request message, or by including the item in a RRC message, e.g. CG-ConfigInfo message. The RRC message may be included as one IE in a Xn/X2 message, e.g. SN(SgNB) Addition Request message.

The MN may include one list for candidate cell identifiers (e.g. candidateCellListCPCSN) in CG-ConfigInfo message to the candidate SN. In one example:

fication information, a corresponding execution condition (or conditions), the measurement results related to the target SN, and/or a CPAC indication to indicate that it is a conditional based procedure.

The SN addition request message 502 from MN to T-SN1 may include a list of suggested CPAC candidate cells suggested by the MN. The list of candidate cells may include a candidate cell ID, CGI, and/or PCI+frequency. The SN addition request message 502 may include an indicator included in the measurement results list provided by the MN (i.e. candidateCellInfoListMN) to indicate whether the indicated cell is suggested as a CPAC candidate cell or not. The list may include a list of cell identifiers and corresponding measurements for that list. The items included in the SN addition request message 502 from the MN may be transferred by including each item as one information element (IE) in a Xn/X2 message, e.g. in the SN(SgNB) addition request message. Alternatively, the items included in the SN addition request message 502 from the MN may be transferred by including each item in a RRC message, e.g. CG-ConfigInfo message. The RRC message may be included as one IE in a Xn/X2 message, e.g. SN(SgNB) addition request message.

The target SN T-SN1 responds with a SN addition request acknowledge 504 to the MN. The SN addition request acknowledge 504 includes the candidate PSCell(s) configuration and/or the selected candidate PSCell identification information. The MN determines and/or configures the execution condition(s) 506 for the candidate PSCell. The MN sends a Xn/X2 message 508 (e.g. Xn-U Address Indication message or other/new Xn/X2 message) to the source SN. The message 508 may include the candidate PSCell

```
CG-ConfigInfo-IEs ::=         SEQUENCE {
[...]
    candidateCellInfoListSN       OCTET STRING (CONTAINING MeasResultList2NR)
OPTIONAL,
[[
    candidateCellListCPCSN-r17    CandidateCellList-CPC          OPTIONAL,
]]
CandidateCellList-CPC ::=     SEQUENCE (SIZE (1..FFS)) OF CandidateCellInfo
CandidateCellInfo ::=         SEQUENCE {
    ssbFrequency              ARFCN-ValueNR                 OPTIONAL,
    candidateCellList         SEQUENCE (SIZE (1..FFS)) OF PhysCellId OPTIONAL,
}
```

MN Initiated CPAC Procedure

FIG. 5A shows an embodiment of a master node (MN) initiated cell change or addition procedure. FIGS. 4A-4B showed a SN initiated CPAC procedure, while FIGS. 5A-5B show MN initiated CPAC. FIGS. 5A-5B illustrate the communication between the user equipment ("UE"), the master node ("MN"), the source secondary node ("S-SN"), a first target secondary node ("T-SN1"), and a second target secondary node ("T-SN2"). The master node MN initiates the conditional SN addition/change procedure by sending a SN addition request message 502 to the target SN T-SN1. This message may include a suggested candidate PSCell identiidentification information accepted/configured by T-SN1, e.g. a candidate cell ID, CGI, and/or PCI+frequency.

The MN sends a cell reconfiguration message 510 to the UE. The cell reconfiguration message 510 may be a RRCReconfiguration message that includes CPAC configuration to the UE. The CPAC configuration may include at least the candidate PSCell configuration generated by T-SN1 and the corresponding execution condition(s) generated by the MN. The UE replies with a reconfiguration complete message 512. The reconfiguration complete message 512 may include a RRCReconfigurationComplete message to the MN to confirm the reception of the cell reconfiguration message 510 or the RRCReconfiguration message. The remaining communications for the MN initiated change/addition procedure are shown in FIG. 5B.

FIG. 5B shows additional features of the master node (MN) initiated cell addition/change procedure shown in FIG. 5A. After the reconfiguration complete message 512 from the UE to the MN, the MN can send a Xn/X2 message 514 (e.g. Xn-U Address Indication message or new/other Xn/X2 message) to the source SN, including the candidate PSCell identification information accepted by the target SN. The message 508 and message 514 may be optional. In one embodiment, only one of the two messages is sent. In some embodiments, the MN may not send a message to the source SN after SN addition procedure and the MN shall inform the accepted/configured candidate PSCell identification information to the source SN after reception of the reconfiguration complete message 512 from the UE. In some embodiments, the MN shall inform the accepted/configured candidate PSCell identification information to the source SN after SN addition procedure and the MN may not send a message to the source SN after reception of the reconfiguration complete message 512 from the UE.

The UE keeps connection with the source SN and starts evaluating the execution condition(s) 516. When at least one execution condition for candidate PSCell is met, the UE selects the related cell as target PSCell and triggers the execution of CPAC to access to T-SN1. At the execution of CPAC, the UE sends a reconfiguration complete message 518 to the MN including an embedded RRCReconfigurationComplete to the target SN. The MN transfers reconfiguration complete message 520 to T-SN1. The UE performs Random Access procedure 522 towards the target PSCell of T-SN1. The order the UE sends a reconfiguration complete message 518 and performs the Random Access procedure 522 towards the target SN may be varied. The MN initiates SN Release procedure 524 towards the source SN (S-SN) to release S-SN resources. The MN initiates SN Release procedure 526 towards other candidate SNs (e.g. T-SN2) to release the reserved candidate PSCell resources.

For the addition procedure, the messages related to the source SN ("S-SN") are not needed. In other words, for the addition procedure, the blocks in FIGS. 5A-5B that can be ignored or skipped include blocks 508, 514, 520, and 524.

Referring back to the SN addition request message 502 from the MN that may include a list of suggested CPAC candidate cells, and/or an indication of whether the cell is a CPAC candidate. The MN includes one list for candidate cell identifiers (e.g. candidateCellListCPCSN) in a CG-Config message to the MN. The following is an example of code for this embodiment:

```
CG-ConfigInfo-IEs ::=            SEQUENCE {
[...]
    candidateCellInfoListMN                              MeasResultList2NR
OPTIONAL,
[[
    candidateCellListCPCMN-r17   CandidateCellList-CPC              OPTIONAL,
]]
CandidateCellList-CPC ::=          SEQUENCE (SIZE (1..FFS)) OF CandidateCellInfo
CandidateCellInfo ::=             SEQUENCE {
    ssbFrequency                 ARFCN-ValueNR               OPTIONAL,
    candidateCellList            SEQUENCE (SIZE (1..FFS)) OF PhysCellId OPTIONAL,
}
```

The MN adds an indicator (e.g. cpcCandidate) in the existing measurements list provided by the MN (i.e. candidateCellInfoListMN) within the CG-ConfigInfo message to indicate whether the cell is a CPC candidate cell or not. The following is an example of code for this embodiment:

```
CG-ConfigInfo-IEs ::=            SEQUENCE {
[...]
    candidateCellInfoListMN                              MeasResultList2NR
OPTIONAL,
[...]
}
[...]
-- ASN1START
-- TAG-MEASRESULT2NR-START
MeasResult2NR ::=                SEQUENCE {
    ssbFrequency                 ARFCN-ValueNR               OPTIONAL,
    refFreqCSI-RS                ARFCN-ValueNR               OPTIONAL,
    measResultServingCell        MeasResultNR                OPTIONAL,
    measResultNeighCellListNR    MeasResultListNR                OPTIONAL,
]

...
}
    MeasResultListNR ::=                       SEQUENCE (SIZE (1..maxCellReport)) OF
MeasResultNR
MeasResultNR ::=                 SEQUENCE {
    physCellId                                              PhysCellId
OPTIONAL,
```

-continued

```
[...]
[[
    cpcCandidate-r17          ENUMERATED {true}       OPTIONAL,
]],
}
```

The MN sends a Xn/X2 message (e.g. Data Forwarding Address Indication message, Xn-U Address Indication message, or other/new Xn/X2 message) to the target SN, in response to at least one of the following: 1) upon reception of SN addition acknowledge message 504 from T-SN1; or 2) upon reception of the reconfiguration complete message 512 (to confirm the reception of CPAC configuration) from the UE. The message may include at least one of 1) a list of candidate PSCell (e.g. candidate cell ID, CGI, frequency+ PCI) accepted/configured by T-SN1; 2) an indication to indicate the MN initiated CPAC or CPAC is configured, or the procedure is involved with MN initiated CPAC or CPAC (e.g. "CPAC indicator"); or 3) the data forwarding information T-SN1, e.g. data forwarding address information, which can be provide per candidate SN or per candidate PSCell. The information may be transferred from the MN to T-SN1 by including the item as one IE in a Xn/X2 message, e.g. Data Forwarding Address Indication message, Xn-U Address Indication message, or other/new Xn/X2 message, or by including the item in a RRC message, e.g. CG-ConfigInfo message. The RRC message may be included as one IE in a Xn/X2 message. Upon reception of the configured candidate PSCells information from the MN, the source SN may perform early data forwarding for SN-terminated bearers, together with the sending of an EARLY STATUS TRANSFER message to the MN, or the source SN may send the updated SCG configuration to the MN when the source SN decides to modify the source SN configuration, regardless of whether SRB3 is configured or not.

The MN may include one list for candidate cell identifiers (e.g. candidateCellListCPCSN) in CG-ConfigInfo message to the source SN. In one example:

a list of candidate PSCells configured via MN initiated CPC; 2) an indicator to indicate MN initiated CPAC has been configured, e.g. set "MN initiated CPAC" indicator as True; or 3) an indicator to indicate SN initiated CPAC can not be configured, e.g. set "SN initiated CPAC" indicator as False. After reception of the indication, the SN shall not configure SN initiated CPAC. If the SN initiated CPAC has been configured, the SN shall release the prepared SN initiated CPAC.

In a second embodiment, S-SN informs the MN when SN initiated CPAC is configured, e.g. upon reception of a reconfiguration complete message from the UE (to confirm the reception of CPAC configuration). In this embodiment, the SN sends the indication to inform the MN about a SN initiated intra-SN CPC via a Xn/X2 signaling. The indication may include: 1) a list of candidate PSCells configured via SN initiated intra-SN CPC; 2) an indicator to indicate SN initiated intra-SN CPC has been configured, e.g. set "SN initiated intra-SN CPC indicator" as True; or 3) an indicator to indicate MN initiated CPC can not be configured, e.g. set "MN initiated CPC" as False. After reception of the indication, the MN shall not configure MN initiated CPC. If the MN initiated CPC has been configured, the MN shall release the prepared MN initiated CPC.

In a third embodiment, the MN indicates to S-SN that the maximum number of candidate PSCells that can be configured by the SN initiated CPAC is set as zero. In this embodiment, SN cannot then initiate the CPAC procedure.

In a fourth embodiment, the MN can directly release candidate PSCells configured by SN initiated CPC, e.g. send the condReconfigToRemoveList to the UE to removed the stored PSCell configuration. The MN informs the release of

```
CG-ConfigInfo-IEs ::=            SEQUENCE {
[...]
       candidateCellInfoListMN                    MeasResultList2NR
OPTIONAL,
[[
    acceptedCellListCPCMN-r17   CandidateCellList-CPC          OPTIONAL,
]]
CandidateCellList-CPC ::=         SEQUENCE (SIZE (1..FFS)) OF CandidateCellInfo
CandidateCellInfo ::=            SEQUENCE {
    ssbFrequency             ARFCN-ValueNR          OPTIONAL,
    candidateCellList          SEQUENCE (SIZE (1..FFS)) OF PhysCellId OPTIONAL,
}
```

FIGS. 4A-4B describe SN-initiated CPAC, while FIGS. 5A-5B describe MN-initiated CPAC. In order to prevent conflicts between the initiation of the CPAC, there may need to be inter-node coordination between the MN and S-SN to prevent both SN-initiated CPAC and MN-initiated CPAC. There are several embodiments for preventing this conflict.

In a first embodiment, the MN informs T-SN1 when MN initiated CPC is configured, e.g. upon reception of SN addition Request Acknowledge from the T-SN1 or reception of the reconfiguration complete message from the UE (to confirm the reception of CPAC configuration). The MN sends an indication to inform the SN about a MN initiated CPAC via a Xn/X2 signaling. The indication may include: 1)

candidate PSCells configured by SN initiated CPC to S-SN via a Xn/X2 message. In this embodiment, MN sends a message to UE to release the candidate PSCells.

The indications in any of the embodiments discussed above can be transferred by including the indication as one IE in a Xn/X2 message, e.g. SN(SgNB) Modification Request, or SN(SgNB) Modification Required message, or by including the indication in a RRC message, e.g. CG-ConfigInfo message or CG-Config message. The RRC message may be included as one IE in a Xn/X2 message.

Successive Conditional Reconfiguration

The conditional handover ("CHO") and conditional PSCell addition/change ("CPAC") may be collectively referred to as conditional reconfiguration. The conditional reconfiguration can be successive as described below. The network may indicate whether successive CHO/CPAC is allowed. For CHO, the network may refer to the source node and for CPAC, the network may refer to the master node ("MN") or the source secondary node ("S-SN"). Successive CHO/CPAC being allowed can be indicated in any of the following embodiments.

In a first embodiment, the indication process for the network may include the network sending an indication to the UE to indicate whether the successive CHO/CPAC is allowed (e.g. "successive CHO/CPAC" or "successive conditional reconfiguration" indicator). In other words, an indication to indicate whether a CHO/CPAC from a target PCell/PSCell/node to other target PCell/PSCell/node after execution of a CHO/CPAC from a source PCell/PSCell/node to a target PCell/PSCell/node is allowed.

In a second embodiment, the indication process for the network may include the network sending an indication to the UE to indicate the UE maintains CHO and/or CPAC candidate cell configuration after completion/execution of the handover procedure and/or the PSCell addition/change procedure (e.g. "maintain CHO/CPAC" or "maintain conditional reconfiguration" indicator).

In a third embodiment, the indication process for the network may include the network sending an indication to the UE to indicate whether CHO and/or CPAC return to the source is allowed (e.g. "return CHO/CPAC" or "return conditional reconfiguration" indicator). In other words, an indication to indicate whether a CHO/CPAC from a target PCell/PSCell/node back to a source PCell/PSCell/node after execution of a CHO/CPAC from a source PCell/PSCell/node to a target PCell/PSCell/node is allowed. The indication in these embodiments may be sent via broadcast signaling (e.g. system information) or dedicated RRC signaling (e.g. RRCReconfiguration message).

In a fourth embodiment, the indication process for the network may include the network informing the UE which candidate cell configuration is maintained after completion/execution of the handover procedure and/or the PSCell addition/change procedure. For example, an indication may be added in the RRCReconfiguration message for CHO/CPAC (e.g. a "maintainCondReconfig" indicator under the IE CondReconfigToAddMod) to indicate whether the indicated candidate cell configuration is maintained after completion/execution of the handover procedure and/or the PSCell addition/change procedure.

In a fifth embodiment, the indication process for the network may include the network informing the UE whether the execution condition(s) set by the initiation node (e.g. source node for CHO, MN for MN initiated CPAC, S-SN for SN initiated CPAC) for all candidate cells or for the indicated candidate cell is maintained after completion/execution of the handover procedure and/or the PSCell addition/change procedure. For example, an indication is added in the RRCReconfiguration message for CHO/CPAC to indicate whether the execution condition(s) is maintained after completion/execution of the handover procedure and/or the PSCell addition/change procedure. In some embodiments, an indication is added in the RRCReconfiguration message for each candidate cell (e.g. a "maintainCondReconfigExecCond" indicator under the IE CondReconfigToAddMod) to indicate whether the indicated candidate cell's execution condition is maintained after completion/execution of the handover procedure and/or the PSCell addition/change procedure.

For successive CHO/CPAC, execution conditions for the subsequent CHO/CPAC may be configured. Since the execution condition(s) is provided by the source node for CHO or the initiation node for CPAC, once successful completion of CHO/CPAC to the target cell occurs, the execution condition that is pre-configured for the previous CHO/CPAC evaluation may become invalid. The network may need to provide updated/new execution condition(s) to the UE for subsequent CHO/CPAC evaluation. Providing the execution conditions for subsequent CHO/CPAC may be performed according to the following embodiments.

In a first embodiment, the source node informs the target node about other prepared candidate cells information when requesting the CHO/CPAC procedure. The target node generates the corresponding execution condition(s) for other candidate cells and transfers the execution condition(s) to the source node. The execution condition can be included in the candidate cell configuration (e.g. RRCReconfiguration message).

In a second embodiment, when the UE successfully completes CHO/CPAC procedure to the target cell or the UE triggers the execution of CHO/CPAC procedure, but has another candidate cell's configuration, the UE informs these candidate cells information (e.g. candidate cell ID, CGI or/and PCI+frequency for the cell whose candidate cell's configuration is maintained at the UE side) to the target cell or for the cell whose candidate cell's configuration is indicated by the NW to be maintained after completion/execution of CHO/CPAC. The target cell can configure or update the execution condition(s) for these candidate cells via a RRCReconfiguration message.

In a third embodiment, upon successful completion/execution of the handover procedure or the PSCell addition/change procedure to the target cell, the source node informs other candidate cells information (e.g. candidate cell ID, CGI or/and PCI+frequency for the candidate cell) to the target cell. The target cell can configure or update the execution condition(s) for these candidate cells via RRCReconfiguration message.

For conditional handover ("CHO") there may be two alternatives to inform the target cell about other candidate cells information. First, the UE informs the target cell about stored candidate cell(s) information (e.g. candidate cell ID; frequency+PCI; CGI) via RRCReconfigurationComplete message to the target cell upon execution/completion of CHO to the target cell. Second, upon reception of a HO success message from the target node (i.e. the first CHO execution to the target is successful), the source node informs all other configured candidate cells information (e.g. candidate cell ID; frequency+PCI; CGI) to the target node via a Xn/X2 message.

For CPAC, the UE informs the target PSCell about stored candidate cell(s) information (e.g. candidate cell ID; frequency+PCI; CGI) via RRCReconfigurationComplete message to the target SN upon execution/completion of CPAC to the target PSCell. The RRCReconfigurationComplete message to the target SN is included in a RRC reconfiguration complete message to the MN. Then the MN transfers the RRCReconfigurationComplete message to the target SN.

Multiple CHO/CPAC configurations may need signaling optimization. A cell configuration template (e.g. source cell configuration or defined common part configuration for multiple cell configuration) can be defined. This can configure multiple cells based on similar configurations using a template. When requesting CHO to the candidate nodes, the source node sends the configuration template to the candidate nodes via a HO Request message. The configuration template is included in the inter-node RRC message (e.g. HandoverPreparationInformation message) within the HO Request message. When requesting SN initiated CPC to the candidate nodes, the source SN sends the configuration template to the MN via SN change required message. The MN sends the received configuration template to candidate SNs via a SN Addition Request message. The configuration template may be included in the inter-node RRC message (e.g. CG-Config message within the SN Change Required message, or CG-ConfigInfo message within SN Addition Request message). When requesting MN initiated CPC/CPA to the candidate nodes, the MN sends the configuration template to the candidate SNs via SN Addition Request message. The configuration template may be included in the inter-node RRC message (e.g. CG-ConfigInfo message) within the SN Addition Request message.

When multiple candidate cells are configured, each cell configuration can be the delta configuration based on the configuration template. After successful completion of handover or PSCell addition/change execution, the UE should keep the source configuration or cell configuration template and other candidate cell configurations. When the execution condition for the next CHO or CPAC is met, the UE should apply the corresponding candidate cell configuration based on the original source configuration or cell configuration template.

Figure 6A:
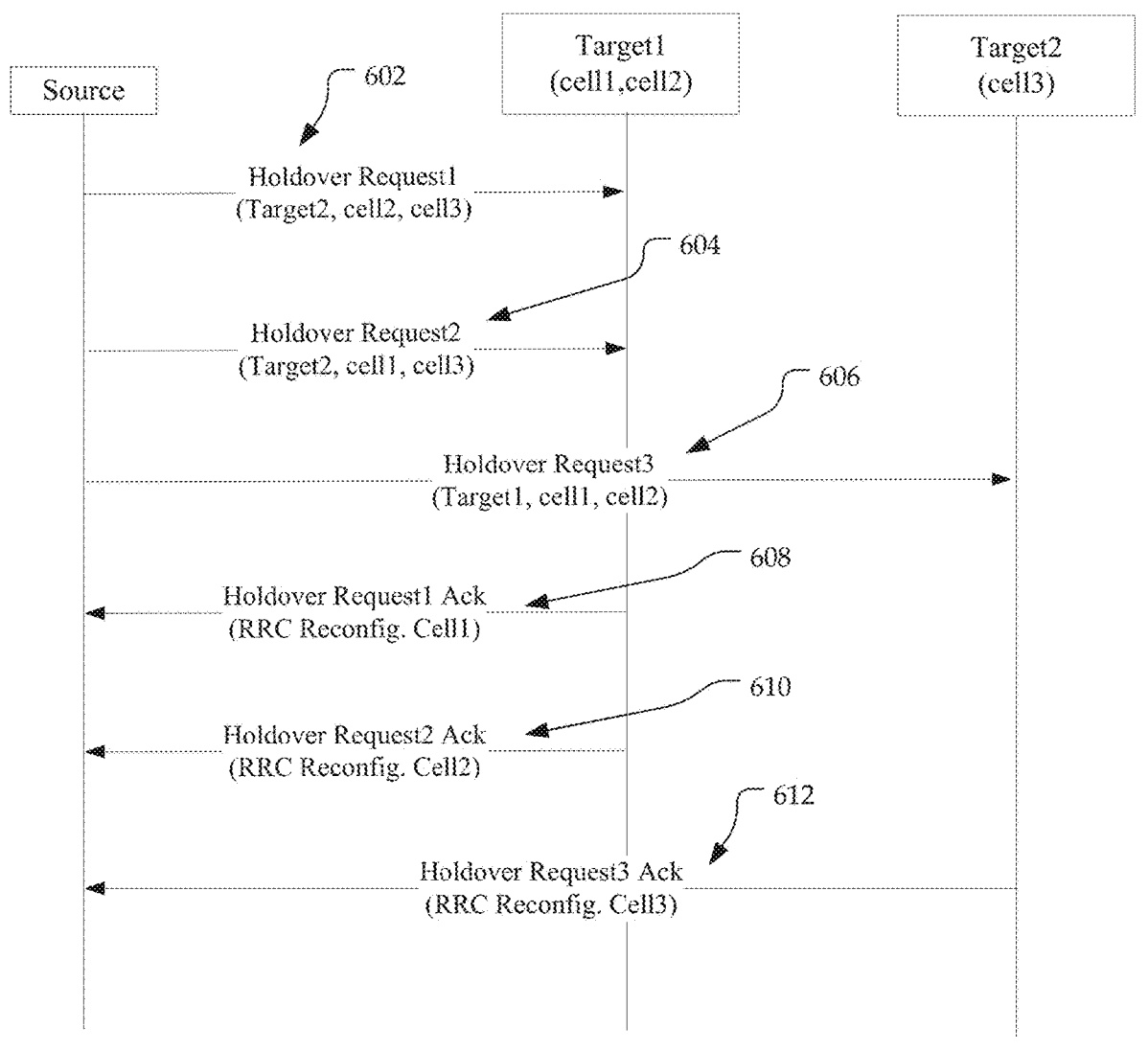
FIG. 6A shows an embodiment of a successive conditional handover (CHO).
Figure 6B:
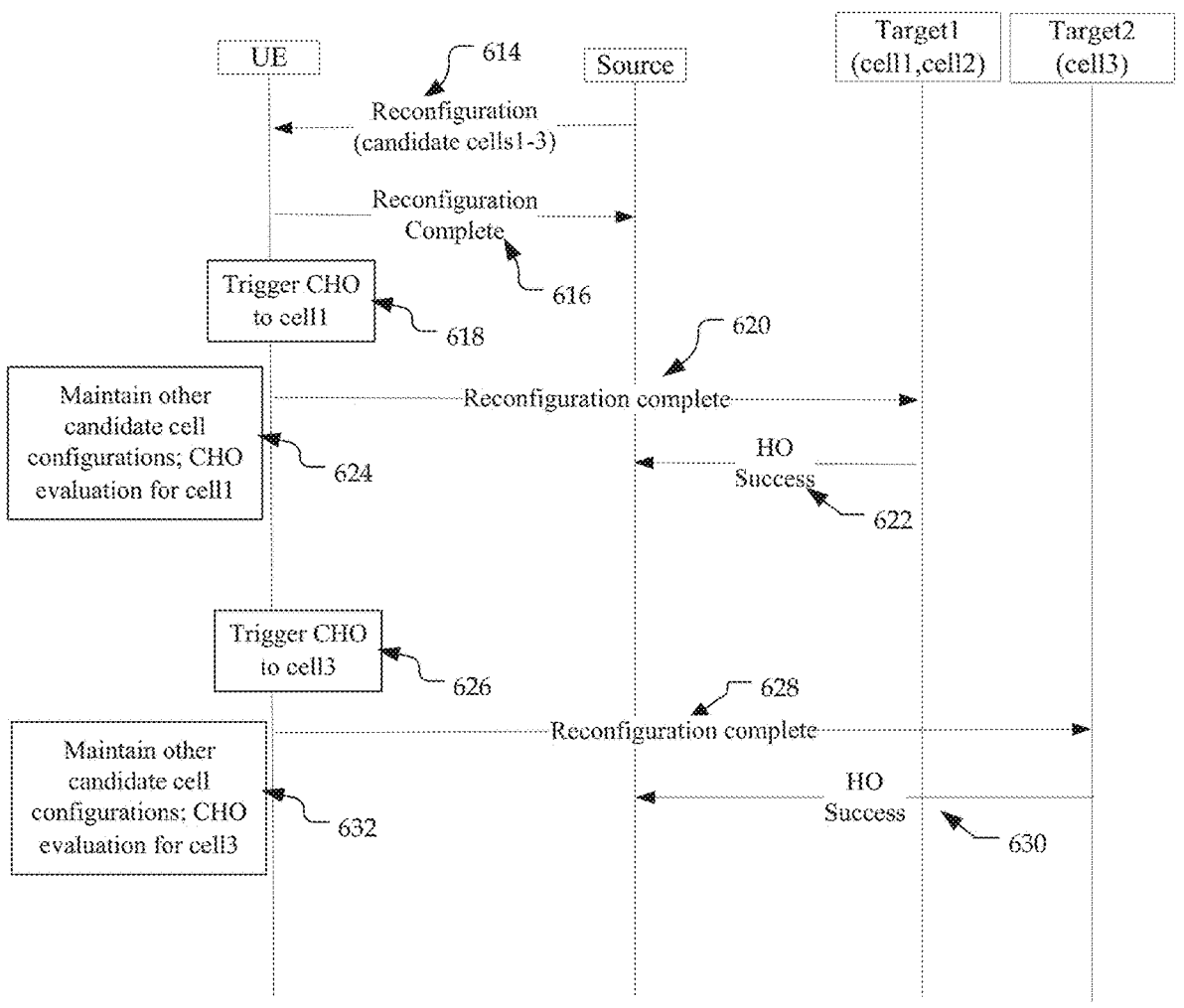
FIG. 6B shows additional features of the successive conditional handover (CHO) shown in FIG. 6A.

FIGS. 6A-6B illustrate a successive conditional handover (CHO). In FIG. 6A, the source node ("source") sends a handover ("HO") request messages 602, 604, 606 to target node(s) to request CHO. A CHO request message is sent for each candidate cell. The HO request1 602 is for cell1, and including other candidate cell information (e.g. cell2 and cell3), the HO request2 604 is for cell2, and including other candidate cell information (e.g. cell1 and cell3), and the HO request3 606 is for cell3, and including other candidate cell information (e.g. cell1 and cell2). The HO request message may include an indication for requesting successive CHO (e.g. "successive CHO request" indicator), other candidate target nodes information (e.g. candidate node ID), or/and other candidate PCells information (e.g. candidate cell ID, PCI+frequency, CGI).

The target node(s) sends CHO responses 608, 610, 612 (i.e. HO Request Acknowledge messages) including configuration of CHO candidate cell(s) to the source node. The CHO response message is sent for each candidate cell. The execution conditions for the subsequent CHO based on other candidate cells may be preconfigured. If the indication for requesting successive CHO is received, the target cell shall generate a set of execution condition, the execution condition(s) is linked per other candidate cell. The set of execution conditions is included in the generated candidate cell configuration (e.g. RRCReconfiguration message). For example, for candidate cell1, the Target1 node provides the candidate cell configuration for cell1 to and the execution condition set including execution condition(s) for cell2 and cell3 to the source node as part of the HO request1 acknowledge message 608. The execution condition set is also included in the RRCReconfiguration message for the candidate cell configuration. The remaining communications for the successive CHO procedure are shown in FIG. 6B.

FIG. 6B shows additional features of the successive conditional handover (CHO) shown in FIG. 6A. The source node sends a reconfiguration message 614 (e.g. RRCReconfiguration message) to the UE, containing the configuration of CHO candidate cell(s), and the corresponding CHO execution condition(s) for each CHO candidate cell. The message 614 may include an indication associated with each candidate cell to indicate whether the indicated candidate cell configuration can be maintained after completion/execution of a handover procedure. The UE responds with a reconfiguration complete message 616 (e.g. a RRCReconfigurationComplete message) to the source node.

The UE maintains connection with the source node after receiving CHO configuration, and starts evaluating the CHO execution conditions for the candidate cell(s) 618. In one embodiment, the UE evaluates whether the execution condition for candidate cell1 is met, then the UE triggers CHO to the candidate cell1. The UE applies the stored corresponding configuration for that selected candidate cell (e.g. cell1), synchronizes to that candidate cell and completes the CHO procedure by sending a reconfiguration complete message 620 (e.g. a RRCReconfigurationComplete message) to the target node (e.g. Target1). The target node sends the HO success message 622 to the source node to inform that the UE has successfully accessed the target cell.

The UE maintains all other candidate cell configuration 624 (e.g. cell2, cell3 configuration) or maintains the candidate cell configuration which is indicated as "maintained" in the reconfiguration message 614 for CHO, and starts evaluating the CHO execution conditions pre-configured by the target cell (i.e. cell1). When the UE determines that the execution condition for candidate cell3 is met, the UE triggers CHO to the candidate cell3 626. The UE completes the CHO procedure by sending a reconfiguration complete message 628 (e.g. a RRCReconfigurationComplete message) to the target node (e.g. Target2). The target node sends the HO success message 630 to the source node to inform that the UE has successfully accessed the target cell. The UE maintains other candidate cell configuration (e.g. cell1, cell2 configuration), and starts evaluating the CHO execution conditions pre-configured by cell3 632.

In some embodiments, the source node may not inform other candidate cells information to the target node when requesting CHO 602, 604, 606. In some embodiments, the target node shall not generate execution conditions for other candidate cells 608, 610, 612. In some embodiments, the UE shall inform all other candidate cell information whose candidate cell configuration is maintained at the UE side, to the target cell (e.g. Target1) via a reconfiguration complete message 622. In some embodiments, after reception of HO success message 622 from the target node, the source node informs all other candidate cell information to the target node via a Xn/X2 message.

In some embodiments, there may be a return of CHO to the source. The difference is the source node may include an indication for CHO return. If CHO return to the source is allowed, then the source node includes an indication (e.g. "CHO return" indicator) in the HO Request message 602, 604, 606 to indicate that CHO return to the source is allowed/requested. The indication can be transferred as one IE in Xn/X2 message (e.g. HO Request message) or as one IE in a RRC message (e.g. HandoverPreparationInformation message) within a Xn/X2 message. The target node generates the execution condition for the source cell and includes the execution condition in the reconfiguration message for the candidate cell. The target node sends the message to the source cell. In 624, after completion/execution of CHO to the target cell (e.g. selected candidate cell1), the UE maintains the source cell configuration. The UE starts CHO evaluation based on the execution condition(s) pre-configured by the target cell. In 626, if the UE evaluates the execution condition for the source cell is met, the UE triggers CHO back to the source cell.

Figure 7A:
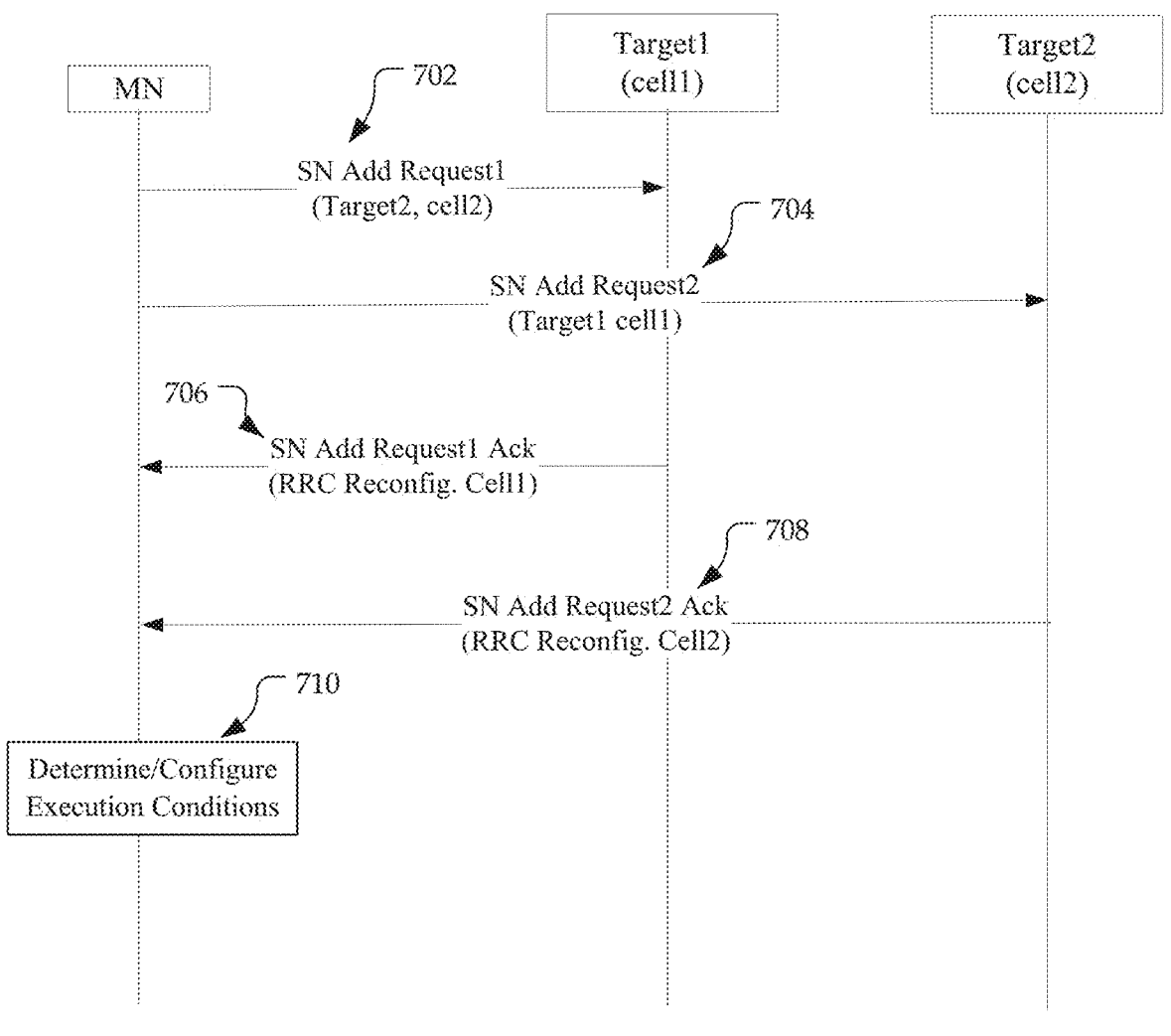
FIG. 7A shows an embodiment of a successive cell change/addition procedure.
Figure 7B:
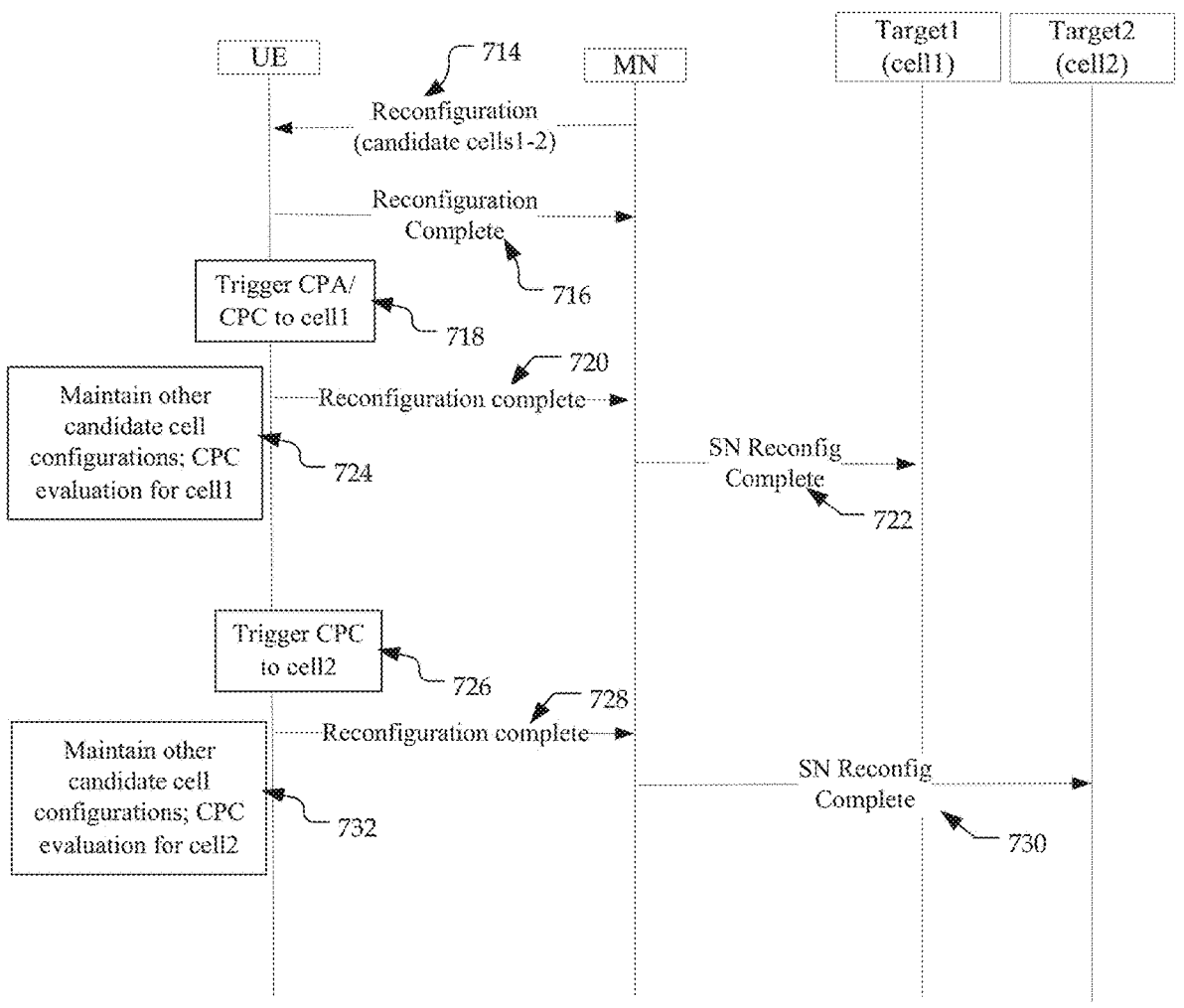
FIG. 7B shows additional features of the successive cell change/addition procedure shown in FIG. 7A.

FIGS. 7A-7B illustrate a successive conditional PSCell addition/change ("CPAC"). In FIG. 7A, the MN initiates the conditional SN addition/change procedure (CPAC) by sending a SN addition request message to the target SN. A SN add request1 message 702 is sent from MN to Target1, and a SN add request2 message 704 is sent from MN to Target2. In each message, the MN may include an indication for requesting successive CPAC (e.g. "successive CPAC request" indicator), other candidate SN nodes information (e.g. candidate node ID), or/and other candidate PSCells information (e.g. candidate cell ID, PCI+frequency, CGI).

The target SN node(s) sends SN addition request acknowledge message including configuration of candidate PSCell(s) to the MN. A SN add request1 acknowledgment message 706 is sent from Target1 to MN, and a SN add request2 acknowledgment message 708 is sent from Target2 to MN. If the indication for requesting/allowing successive CPAC is received, the target SN node shall generate a set of execution condition, the execution condition(s) is linked per other candidate PSCell. The set of execution condition is included in the generated candidate cell configuration (e.g. RRCReconfiguration message). For example, for candidate cell1, Target1 node provides the candidate cell configuration for cell1 and the execution condition set including execution condition(s) for cell2 to the MN. The execution condition set is also included in the RRCReconfiguration message for candidate cell configuration. When MN initiates CPAC, the MN determines the execution condition(s) for the candidate PSCell 710. The remaining communications for the successive CPAC procedure are shown in FIG. 7B.

FIG. 7B shows additional features of the successive cell change/addition procedure shown in FIG. 7A. The MN sends a reconfiguration message 714 (e.g. RRCReconfiguration message) to the UE, containing the configuration of CPAC candidate cell(s) and the corresponding execution condition(s) for each candidate cell. In the reconfiguration message, the MN may indicate which candidate cells and/or execution conditions can be maintained after completion/execution of CPAC to the target cell. The UE responses with a reconfiguration complete message 716 (e.g. RRCReconfigurationComplete) to the MN. The UE starts evaluating the CPA/CPC execution conditions for the candidate cell(s). When the UE determines the execution condition for candidate cell1 is met, the UE triggers CPAC to the candidate cell1 718.

The UE applies the stored corresponding configuration for that selected candidate PSCell (e.g. cell1), synchronizes to that candidate PSCell and sends reconfiguration complete message 720 to the MN including an embedded RRCReconfigurationComplete message to the target SN. The MN transfers the SN reconfiguration complete message 722 to the target SN (e.g. Target1). The UE maintains other candidate PSCell configuration (e.g. cell2 configuration) or maintains 724 the candidate cell configuration which is indicated as "maintained" in RRCReconfiguration message for CPAC. The UE removes the execution condition set by the MN and starts evaluating the CPAC execution conditions pre-configured by cell1. When the UE determines the execution condition for candidate cell2 is met, the UE triggers CPAC to the candidate cell2 726. The UE sends a reconfiguration complete message 728 to the MN. The MN transfers the SN reconfiguration complete message 730 to the target SN (e.g. Target2). The UE maintains 732 other candidate PSCell configurations (e.g. cell1 configuration), and starts evaluating the CPAC execution conditions pre-configured by cell2.

In some embodiments, for SN initiated CPAC, the source SN shall send a SN change required message to the MN to request the SN initiated SN change procedure, and the execution conditions for the first CPAC execution are generated by the source SN. In some embodiments, the MN shall not inform other candidate cells information to the target SN when requesting CPA/CPC 702, 704. In some embodiments, the target SN shall not generate execution conditions for other candidate cells 706, 708. In some embodiments, after trigger the first CPA to the target cell, the UE shall maintain the execution condition provided by the MN or maintain the execution condition which is indicated as "maintained" in RRCReconfiguration message for CPAC and continue to evaluate other candidate cells for CPC execution based on the configured execution condition. In some embodiments, the UE shall inform all other candidate cell information to the target SN node (e.g. Target SN_1) via SN RRCReconfigurationComplete message embedded in a RRC reconfiguration complete to the MN 720, 728.

The CPAC may be returned to the source. If CPAC return to the source is allowed, the MN may include an indication (e.g. "CPAC_return" indicator) in the SN Addition Request message 702, 704 to indicate that CPAC return to the source is allowed/requested. The indication can be transferred as one IE in Xn/X2 message (e.g. SN Addition Request message) or as one IE in a RRC message (e.g. CG-ConfigInfo message) within a Xn/X2 message. In 706, 708, the target node generates the execution condition for the source cell and includes the execution condition in the RRCReconfiguration message for the candidate cell. The target node sends the message to the source cell. In 724, after completion/execution of CPAC to the target cell (e.g. selected candidate cell1, the UE maintains the source cell configuration. The UE starts CPAC evaluation based on the execution condition(s) pre-configured by the target cell. In 726, when the execution condition for the source cell is met, the UE triggers CPAC back to the source cell.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for wireless communication comprising:
sending, by a master node (MN) to a first target secondary node, a secondary node (SN) addition request for a SN change from a source SN or a SN addition of the first target SN, wherein the request comprises candidate cell information for the first target SN;
receiving, by the MN from the first target SN, a response that includes at least one candidate cell configuration; and
sending, by the MN to a user equipment (UE), a radio resource control (RRC) message with the at least one candidate cell configuration and one or more execution conditions for each candidate cell to cause the UE to: trigger a change from the source SN to the first target SN or a SN addition of the first target SN based on a candidate cell configuration of the at least one candidate cell configuration when the one or more execution conditions for one of the candidate cells from the first target SN are met; and subsequently trigger a change from the first target SN to a second target SN or a SN addition of the second target SN based on another candidate cell configuration of the at least one candidate cell configuration when an execution condition for the second target SN provided by the first target SN is met,
wherein the at least one candidate cell configuration is maintained after completion of the change from the source SN to the first target SN or after completion of the SN addition of the first target SN to perform the change from the first target SN to the second target SN or the SN addition of the second target SN.

2. The method of claim 1, wherein the candidate cell information comprises one or more candidate primary secondary cell (PSCell) identification information.

3. The method of claim 1, wherein the MN provides measurement results of one or more cells in the first target SN, and wherein the measurement results for each cell include an indicator for whether the cell is a candidate PSCell.

4. The method of claim 1, further comprising:
sending, by the MN to the source SN, a candidate cell identification information selected by the first target SN, in response to receiving a response that includes the candidate cell configuration of the at least one candidate cell configuration from the first target SN.

5. The method of claim 1, further comprising:
receiving, by the MN from the UE, a RRC complete message to confirm a reception of the RRC message with the candidate cell configuration of the at least one candidate cell configuration.

6. The method of claim 1, wherein the candidate cell information comprises one or more candidate cell identification information that have been configured as a candidate PSCell.

7. The method of claim 1, wherein the SN addition request to the first target SN comprises at least one of an indication to indicate a SN change from the first target SN back to the source SN after execution of a SN change to the first target SN is allowed, or an indication to indicate a SN change from the first target SN to other target SNs after execution of a SN change to the first target SN or after execution of a SN addition of the first target SN is allowed.

8. The method of claim 1, wherein the RRC message comprises at least one of: an indication for the candidate cell configuration of the at least one candidate cell configuration to indicate whether the candidate cell configuration of the at least one candidate cell configuration is maintained after completion of a change from the source SN to the first target SN or after completion of the SN addition of the first target SN; or an indication to indicate whether the one or more execution conditions for each candidate cell or for the indicated candidate cell is maintained after completion of the change from the source SN to the first target SN or after completion of the SN addition of the first target SN.

9. A method for wireless communication comprising:

receiving, by a first target secondary node (SN) from a master node (MN), a secondary node (SN) addition request for a SN change from a source SN or a SN addition of the first target SN, wherein the request comprises candidate cell information for the first target SN;

sending, by the first target SN to the MN, a response that includes at least one candidate cell configuration; and wherein the MN sends to a user equipment (UE), a radio resource control (RRC) message with the at least one candidate cell configuration and one or more execution conditions for each of a plurality of candidate cells to cause the UE to: trigger a change from the source SN to the first target SN or a SN addition of the first target SN based on a candidate cell configuration of the at least one candidate cell configuration when the one or more execution conditions for one of the candidate cells from the first target SN are met; and subsequently trigger a change from the first target SN to a second target SN or a SN addition of the second target SN based on another candidate cell configuration of the at least one candidate cell configuration when the execution condition for the second target SN provided by the first target SN is met, wherein the at least one candidate cell configuration is maintained after completion of the change from the source SN to the first target SN or after completion of the SN addition of the first target SN to perform the change from the first target SN to the second target SN or the SN addition of the second target SN.

10. The method of claim 9, wherein the candidate cell information comprises one or more candidate primary secondary cell (PSCell) identification information.

11. The method of claim 9, wherein the MN provides measurement results of one or more cells in the first target SN, and wherein the measurement results for each cell include an indicator for whether the cell is a candidate PSCell.

12. The method of claim 9, wherein the MN sends to the source SN, a candidate cell identification information selected by the first target SN, in response to receiving a response that includes candidate cell configuration from the first target SN.

13. The method of claim 9, wherein the MN receives from the UE, a RRC complete message to confirm a reception of the RRC message with the candidate cell configuration, and wherein the MN sends to the source SN, a candidate cell identification information selected by the first target SN, in response to receiving a RRC complete message from the UE.

14. The method of claim 9, wherein the candidate cell information comprises one or more candidate cell identification information that have been configured as a candidate PSCell.

15. The method of claim 9, wherein the SN addition request to the first target SN comprises at least one of an indication to indicate a SN change from the first target SN back to the source SN after execution of a SN change to the first target SN is allowed, or an indication to indicate a SN change from the first target SN to other target SNs after execution of a SN change to the first target SN or after execution of a SN addition of the first target SN is allowed.

16. The method of claim 9, wherein the RRC message comprises at least one of: an indication for each candidate cell configuration to indicate whether the candidate cell configuration is maintained after completion of the change from the source SN to the first target SN or after completion of the SN addition of the first target SN; or an indication to indicate whether the one or more execution conditions for each candidate cell or for the indicated candidate cell is maintained after completion of the change from the source SN to the first target SN or after completion of the SN addition of the first target SN.

17. The method of claim 9, further comprising:

receiving, by the first target SN from the UE via the MN, a RRC complete message to inform the execution of the change from the source SN to the first target SN or the execution of the SN addition of the first target SN, wherein the RRC complete message comprises a candidate PSCell identification information whose candidate cell configuration is maintained at the UE.

18. A method for wireless communication comprising:

receiving, by a user equipment (UE) from a master node (MN), a radio resource control (RRC) message with at least one candidate cell configuration and one or more execution conditions for each of at least one candidate cell;

performing, by a UE, a change from a source secondary node (SN) to a first target secondary node (SN) or a secondary node (SN) addition of the first target SN based on a candidate cell configuration of the at least one candidate cell configuration when the one or more execution conditions for one of the candidate cells from the first target SN are met; and performing, by the UE, a change from the first target SN to a second target SN or a SN addition of the second target SN based on another candidate cell configuration of the at least one candidate cell configuration when an execution condition for the second target SN provided by the first target SN is met, wherein the at least one candidate cell configuration is maintained after completion of the change from the source SN to the first target SN or after completion of the SN addition of the first target SN to perform the change from the first target SN to the second target SN or the SN addition of the second target SN.

19. The method of claim 18, wherein the RRC message comprises at least one of: an indication for the candidate cell configuration of the at least one candidate cell configuration to indicate whether the candidate cell configuration of the at least one candidate cell configuration is maintained after completion of a change from the source SN to the first target SN or completion of the SN addition of the first target SN; or an indication to indicate whether the one or more execution conditions for each candidate cell or for the indicated candidate cell is maintained after completion of the change from the source SN to the first target SN or completion of the SN addition of the first target SN.

20. The method of claim 18, further comprising:

sending, by the UE to the MN, a RRC complete message to inform the execution of the change from the source secondary node to the target secondary node or the execution of the secondary node addition of the target secondary node, wherein the RRC complete message including a second RRC complete message sent to the target secondary node.

* * * * *